US008107410B2

(12) United States Patent
Connors et al.

(10) Patent No.: US 8,107,410 B2
(45) Date of Patent: Jan. 31, 2012

(54) MAP-TRIGGERED DUMP OF PACKETS IN SATELLITE COMMUNICATION SYSTEM

(75) Inventors: Dennis Patrick Connors, San Diego, CA (US); Matthew John Freier, Carlsbad, CA (US); James Edward Deveau, Carlsbad, CA (US); Xiao Wu, Temecula, CA (US); Kristi Ann Jaska, Encinitas, CA (US)

(73) Assignee: ViaSat, Inc., Carlsbad, CA (US)

( * ) Notice: Subject to any disclaimer, the term of this patent is extended or adjusted under 35 U.S.C. 154(b) by 504 days.

(21) Appl. No.: 12/408,614

(22) Filed: Mar. 20, 2009

(65) Prior Publication Data
US 2009/0290532 A1 Nov. 26, 2009

Related U.S. Application Data

(63) Continuation of application No. PCT/US2007/079571, filed on Sep. 26, 2007.

(60) Provisional application No. 60/828,014, filed on Oct. 3, 2006.

(51) Int. Cl.
*H04B 7/185* (2006.01)

(52) U.S. Cl. ........................................ 370/316

(58) Field of Classification Search .................. 370/316, 370/318, 319, 393, 394, 315, 329, 321, 468, 370/330, 341, 344, 347, 349, 412, 401
See application file for complete search history.

(56) References Cited

U.S. PATENT DOCUMENTS
5,485,464 A 1/1996 Strodtbeck et al.
(Continued)

FOREIGN PATENT DOCUMENTS
EP 1705838 A1 9/2006
(Continued)

OTHER PUBLICATIONS

Communication pursuant to Article 94(3) EPC from European Patent Office, corresponding to the Application No. 07 868 345.5, dated Mar. 31, 2011, 4 pages total.

(Continued)

*Primary Examiner* — Chi H Pham
*Assistant Examiner* — Alexander Boakye
(74) *Attorney, Agent, or Firm* — Kilpatrick Townsend & Stockton LLP

(57) ABSTRACT

Upstream information arriving through a user terminal in a satellite link is efficiently scheduled through a modified Demand Assigned Multiple Access (DAMA) algorithm such that data packets arriving at the user terminal are concatenated to form a larger frame for transmission and the concatenated packet is held in a first queue disposed ahead of a second queue, where the data in the second queue cannot be modified (typically a hardware queue), sufficient to allow the second queue to be emptied. In a specific embodiment, all packets arriving at the user terminal since a prior piggyback request are concatenated so that all currently known packets (up to a preselected limit) are accounted for by each succeeding piggyback request. Since it is desirable to concatenate all packets that arrive at the user terminal since the last piggyback request, the piggyback request according to the invention covers all currently known packets (up to the preselected limit) in the user terminal. The held-back packets are released or dumped to the second queue by a trigger operative according to a map, the map being a grant allocation schedule. This mechanism handles instances where the second queue is not able to handle all known packets.

8 Claims, 22 Drawing Sheets

U.S. PATENT DOCUMENTS

| | | | |
|---|---|---|---|
| 5,825,325 | A | 10/1998 | O'Donovan et al. |
| 5,907,541 | A | 5/1999 | Fairholm et al. |
| 6,449,267 | B1 | 9/2002 | Connors |
| 6,512,749 | B1 | 1/2003 | Wright et al. |
| 6,690,645 | B1 | 2/2004 | Aweya et al. |
| 6,707,916 | B1 | 3/2004 | Caso et al. |
| 6,778,509 | B1 | 8/2004 | Ravishankar et al. |
| 6,865,388 | B2 | 3/2005 | Walsh et al. |
| 6,985,455 | B1 | 1/2006 | Heath et al. |
| 7,010,265 | B2 | 3/2006 | Coffin |
| 7,024,158 | B2 | 4/2006 | Wiswell |
| 7,319,666 | B2 | 1/2008 | Goosman |
| 7,508,785 | B2 | 3/2009 | Dale et al. |
| 7,535,863 | B2 | 5/2009 | Gin et al. |
| 7,970,010 | B2 * | 6/2011 | Denney et al. ............... 370/468 |
| 2001/0053152 | A1 | 12/2001 | Sala et al. |
| 2002/0004369 | A1 | 1/2002 | Kelly et al. |
| 2002/0037734 | A1 | 3/2002 | McKenna et al. |
| 2002/0110094 | A1 | 8/2002 | Reddy |
| 2002/0187747 | A1 | 12/2002 | Sawdey et al. |
| 2003/0032391 | A1 | 2/2003 | Schweinhart et al. |
| 2003/0050008 | A1 | 3/2003 | Patterson et al. |
| 2003/0050060 | A1 | 3/2003 | Leslie et al. |
| 2003/0069034 | A1 | 4/2003 | Lee |
| 2003/0203733 | A1 | 10/2003 | Sharon |
| 2004/0014472 | A1 | 1/2004 | de La Chapelle et al. |
| 2004/0018849 | A1 | 1/2004 | Schiff |
| 2004/0162020 | A1 | 8/2004 | Dale et al. |
| 2004/0198218 | A1 | 10/2004 | Linsky et al. |
| 2005/0265376 | A1 | 12/2005 | Chapman et al. |

FOREIGN PATENT DOCUMENTS

| | | |
|---|---|---|
| WO | WO 00/52849 A1 | 9/2000 |
| WO | WO 2008/060759 A2 | 5/2008 |

OTHER PUBLICATIONS

Satellite One, "Spot Beam Technology," [online], [retrieved on Mar. 6, 2009]. Retrieved from the internet <URL: http//www.satelliteone.com/dish/support/Spot_Beam_Short.pdf>.

Bambos, N., et al., "Globally Constrained Power Control Across Multiple Channels in Wireless Data Networks", Mobile Networks and Applications, Sep. 2001, vol. 6, pp. 427-434.

Bhatia, S., et al., "Empirical Evaluation of Upstream Throughput in a DOCSIS Access Network", 2005, 1st International Conference on Multimedia Services Access Networks, Jun. 13-15, 2005, 8 pages.

Hindin, E., "Saywhat?," Network World, Aug. 17, 1998, vol. 37, 8 pages.

Xiao, Y., "Efficient MAC Strategies for the IEEE 802.11n Wireless LANs", Wireless Communications and Mobile Computing, 2006, vol. 6, pp. 453-466.

Xiao, Y., "IEEE 802.11 Performance Enhancement via Concatenation and Piggyback Mechanisms", IEEE Transactions on Wireless Communications, Sep. 2005, vol. 4, No. 5, pp. 2182-2192.

International Preliminary Report on Patentability and Written Opinion for PCT/US2007/079571, dated on Apr. 7, 2009, 9 pages total.

International Search Report for PCT/US2007/079571, mailed on Jun. 5, 2008, 3 pages total.

Atia, "Ka-Band Satellite System Architecture for Local Loop Internet Access," Microwave Symposium Digest, 2001 IEEE MTT-S Digest, International, Phoenix, AZ, (2001) vol. 2, pp. 1133-1136.

Atia, et al., "Ka-Band Satellite System Architecture for Local Loop Internet Access," Fifth Ka Band Utilization Conference: Oct. 18-20, 1999, Taormina, Italy, (2000) Genova: Instituto Internationale Delle Comunicazioni.

Connors et al., "A Medium Access Control Protocol for Real Time Video Over High Latency Satellite Channels," Mobile Networks and Applications, ACM, New York, Jan. 1, 2002, pp. 9-20, ISSN: 1383-469X.

Connors et al., "Response Initiated Multiple Access (RIMA), A Medium Access Control Protocol for Satellite Channels," GLOBECOM'00 IEEE Global Telecommunications Conference, New York NY Nov. 27, 2000, pp. 1124-1129. ISBN: 978-0-7803-6452-3.

Elshabrawy, "MAC Architecture for Broadband Satellite Access Systems," Apr. 20, 2000, pp. III-100. [retrieved on May 29, 2008] Retrieved from the internet: <URL:http://users.enc.concordia.ca/{tahar/theses/Tallal-Thesis.pdf>.

Karaliopoulos et al., "Providing Differentiated Service to TCP Flows Over Bandwidth on Demand Geostationary Satellite Networks," IEEE Journal on Selected Areas in Communications, vol. 22, No. 2, Feb. 1, 2004, pp. 333-347 ISSN: 0733-8716.

Le-Ngoc et al., "Performance Analysis of CFDAMA-PB Protocol for Packet Satellite Communications," Sep. 1998, pp. 1206-1214, vol. 46, No. 9,. IEEE Transactions on Communications.

Mitchell et al., "Burst Targeted Demand Assignment Multiple-Access for Broadband Internet Service Delivery Over Geostationary Satellite," IEEE Journal on Selected Areas in Communications, vol. 22, No. 3, Apr. 2004, pp. 546-558. ISSN: 0733-8716.

Mitchell et al., "Improved Medium Access Control for Data Traffic Via Satellite Using the CFDAMA Protocol," IEE Seminar on Broadband Satellite: The Critical Success Factorstechnology, Services and Markets, pp. 18/01-18/07 XP001061698.

Ramirez et al., "Single-feed circularly polarized microstrip ring antenna and arrays," IEEE Transactions on Antennas and Propagation, vol. 48, No. 7, p. 1040-1047, Jul. 2000. [retrieved on Mar. 26, 2008]. Retrieved from the internet: <URL: http://www.ece.ucl.edu/rfmems/publications/papers/antenna/J009.pdf>.

Todorova et al., "Quality-of-Service-Oriented Media Access Control for Advanced Mobile Multimedia Satellite Systems," Systems Sciences, 2003. Proceedings of the 36th Hawaii International Conference on System Sciences, Jan. 6-9, 2003, pp. 309-316. ISBN: 978-0-7695-1874-9.

* cited by examiner

MAP-TRIGGERED DUMP OF PACKETS IN SATELLITE COMMUNICATION SYSTEM

CROSS-REFERENCE TO RELATED APPLICATIONS

This application is a continuation application of International Application Number PCT/US2007/79571 filed Sep. 26, 2007, which claimed benefit of provisional Patent Application Ser. No. 60/828,014 filed Oct. 3, 2006. This application expressly incorporates by reference each of the following patent applications in their entirety for all purposes:

PCT Application Serial No. PCT/US07/79577, filed Sep. 26, 2007 on the same date as the parent PCT application, entitled "Improved Spot Beam Satellite Ground Systems";

PCT Application Serial No. PCT/US2007/079561, filed Sep. 26, 2007 on the same date as the parent PCT application, entitled "Multi-Service Provider Subscriber Authentication";

PCT Application Serial No. PCT/US2007/079565, filed Sep. 26, 2007 on the same date as the parent PCT application, entitled "Large Packet Concatenation In Satellite Communication System";

PCT Application Serial No. PCT/US2007/79569, filed Sep. 26, 2007 on the same date as the present PCT application, entitled "Upfront Delayed Concatenation In Satellite Communication System";

PCT Application Serial No. PCT/US2007/079563, filed Sep. 26, 2007 on the same date as the parent PCT application, entitled "Web/Bulk Transfer Preallocation Of Upstream Resources In A Satellite Communication System";

PCT Application Serial No. PCT/US07/079567, filed Sep. 26, 2007 on the same date as the parent PCT application, entitled "Improved Spot Beam Satellite Systems";

PCT Application Serial No. PCT/US07/79517, filed Sep. 26, 2007 on the same date as the parent PCT application, entitled "Downstream Waveform Sub-Channelization For Satellite Communications";

PCT Application Serial No. PCT/US07/79523, filed Sep. 26, 2007 on the same date as the parent PCT application, entitled "Packet Reformatting For Downstream Links"; and PCT Application Serial No. PCT/US07/79541, filed Sep. 26, 2007 on the same date as the parent PCT application, entitled "Upstream Resource Allocation For Satellite Communications";

U.S. Provisional Patent Application No. 60/828,044, filed Oct. 3, 2006 for "Web/Bulk Transfer Preallocation Of Upstream Resources In A Satellite Communication System";

U.S. Continuation in Part patent application Ser. No. 11/538,431, filed Oct. 3, 2006 for "Code Reuse Multiple Access For A Satellite Return Link";

U.S. Continuation in Part patent application Ser. No. 11/538,429, filed Oct. 3, 2006 for "Method For Congestion Management".

FIELD OF THE INVENTION

The present invention relates to wireless communications in general and, in particular, to a satellite communications network.

BACKGROUND OF THE INVENTION

Consumer broadband satellite services are gaining traction in North America with the start up of star network services using Ka band satellites. While such first generation satellite systems may provide multi-gigabit per second (Gbps) per satellite overall capacity, the design of such systems inherently limits the number of customers that may be adequately served. Moreover, the fact that the capacity is split across numerous coverage areas further limits the bandwidth to each subscriber.

While existing designs have a number of capacity limitations, the demand for such broadband services continues to grow. The past few years have seen strong advances in communications and processing technology. This technology, in conjunction with selected innovative system and component design, may be harnessed to produce a novel satellite communications system to address this demand.

DAMA Basics

A DAMA user SM is operative to transmit a request to the DAMA scheduler at the gateway, or SMTS, requesting upstream bandwidth sufficient to transmit the packet that is in its output queue. Ignoring the contention delay (i.e. the delay to contend for, possibly collide in, and finally successfully transmit in the contention channel), the arriving packet must wait a handshake interval until bandwidth is assigned. The handshake interval is the round trip time between the terminal and the central controller (in this case the SMTS), denoted RTT. The terminal will then transmit the packet and, ignoring the transmit time, the packet will arrive at the central controller one half an RTT later. This process implies that all packets arriving to an empty output queue will experience a delay of 1.5×RTT, not counting the contention delay. This delay of 1.5×RTT is an irreducible lower bound.

Because packets that arrive to a non empty queue must wait until they move to the head of the queue, these packets will experience a total delay greater than 1.5×RTT. Their delay is their wait time plus 1.5×RTT. The DAMA scheduler attempts to minimize the wait time of packets that arrive to a non-empty queue.

DOCSIS Best Effort DAMA (BE-DAMA) is pure DAMA with the sole exception that requests for bandwidth can be piggybacked on transmitted data packets so as to take some of the loading off the contention channel, and hence increase overall system capacity. This means that a burst of packets arriving to a DOCSIS cable modem (CM) will have only one contention delay for the entire burst. The piggybacked request mechanism limits the request to just describe the packet in position 1 in the output queue (the packet being transmitted occupies position 0 in the output queue). This implies that the first packet of a burst (p0) will have a delay of 1.5×RTT, packet 1 will have a delay of up to 2.5×RTT, packet 2 will have a delay of up to 3.5×RTT, and so on.

A Demand Assigned Multiple Access (DAMA) scheduler is useful for relieving some of the load in a channel subject to contention. The goal of a DAMA scheduler in this instance is to reduce the number of assigned-but-unused minislots on the upstream channel (i.e. improve scheduling efficiency) without degrading webpage-download or FTP upload performance which uses the downstream channels. The ultimate goal is to provide more available upstream bandwidth to support more subscribers per upstream. By the nature of burst transmission of packets, a burst of packets can have only one contention delay for the entire burst. However, DAMA produces collisions in the contention channel since the arrival of packets is not deterministic, thus producing undesired latency and inefficiency in channel usage. To improve efficiency, what is needed is a mechanism to reduce the wait time. DAMA is a potential tool in a mechanism to this end.

Concise Explanation of the Invention

According to the invention, upstream information arriving through a user terminal in a satellite link is efficiently scheduled through a modified Demand Assigned Multiple Access (DAMA) algorithm such that data packets arriving at the user terminal are concatenated to form a larger frame for transmission and the concatenated packet is held in a first queue disposed ahead of a second queue, where the data in the second queue cannot be modified (typically a hardware queue), sufficient to allow the second queue to be emptied. In a specific embodiment, all packets arriving at the user terminal since a prior piggyback request are concatenated so that all currently known packets (up to a preselected limit) are accounted for by each succeeding piggyback request. Since it is desirable to concatenate all packets that arrive at the user terminal since the last piggyback request, the piggyback request according to the invention covers all currently known packets (up to the preselected limit) in the user terminal. The held-back packets are released or dumped to the second queue by a trigger operative according to a map, the map being a grant allocation schedule. This mechanism handles instances where the second queue is not able to handle all known packets.

The invention will be better understood by reference to the detailed description and the accompanying drawings.

DETAILED DESCRIPTION OF THE INVENTION

Various embodiments of the present invention comprise systems, methods, devices, and software for a novel broadband satellite network. This description provides exemplary embodiments only, and is not intended to limit the scope, applicability or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner. Also, a number of steps may be required before, after, or concurrently with the following embodiments.

It should also be appreciated that the following systems, methods, devices, and software may be a component of a larger system, wherein other procedures may take precedence over or otherwise modify their application.

Figure 1A:
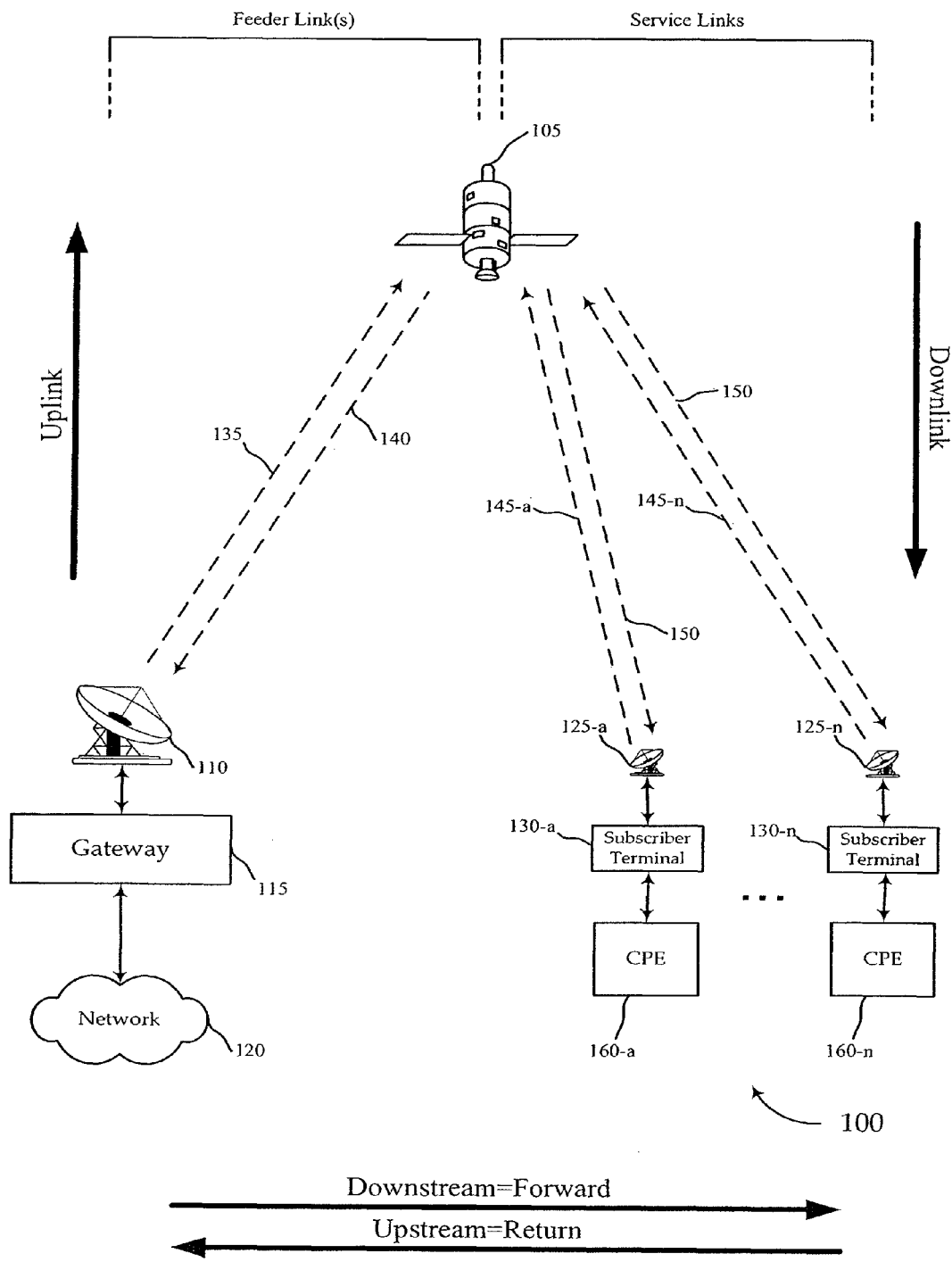
FIGS. 1A and 1B are block diagrams of a satellite communication system

FIG. 1A is a block diagram of an exemplary satellite communications system 100 configured according to various embodiments of the invention. The satellite communications system 100 includes a network 120, such as the Internet, interfaced with a gateway 115 that is configured to communicate with one or more subscriber terminals 130, via a satellite 105. A gateway 115 is sometimes referred to as a hub or ground station. Subscriber terminals 130 are sometimes called modems, satellite modems or user terminals. As noted above, although the communications system 100 is illustrated as a geostationary satellite 105 based communication system, it should be noted that various embodiments described herein are not limited to use in geostationary satellite based systems, for example some embodiments could be low earth orbit (LEO) satellite based systems.

The network 120 may be any type of network and can include, for example, the Internet, an IP network, an intranet, a wide-area network ("WAN"), a local-area network ("LAN"), a virtual private network, the Public Switched Telephone Network ("PSTN"), and/or any other type of network supporting data communication between devices described herein, in different embodiments. A network 120 may include both wired and wireless connections, including optical links. Many other examples are possible and apparent to those skilled in the art in light of this disclosure. As illustrated in a number of embodiments, the network may connect the gateway 115 with other gateways (not pictured), which are also in communication with the satellite 105.

The gateway 115 provides an interface between the network 120 and the satellite 105. The gateway 115 may be configured to receive data and information directed to one or more subscriber terminals 130, and can format the data and information for delivery to the respective destination device via the satellite 105. Similarly, the gateway 115 may be configured to receive signals from the satellite 105 (e.g., from one or more subscriber terminals) directed to a destination in the network 120, and can format the received signals for transmission along the network 120.

A device (not shown) connected to the network 120 may communicate with one or more subscriber terminals, and through the gateway 115. Data and information, for example IP datagrams, may be sent from a device in the network 120 to the gateway 115. The gateway 115 may format a Medium Access Control (MAC) frame in accordance with a physical layer definition for transmission to the satellite 130. A variety of physical layer transmission modulation and coding techniques may be used with certain embodiments of the invention, including those defined with the DVB-S2 and WiMAX standards. The link 135 from the gateway 115 to the satellite 105 may be referred to hereinafter as the downstream uplink 135.

The gateway 115 may use an antenna 110 to transmit the signal to the satellite 105. In one embodiment, the antenna 110 comprises a parabolic reflector with high directivity in the direction of the satellite and low directivity in other directions. The antenna 110 may comprise a variety of alternative configurations and include operating features such as high isolation between orthogonal polarizations, high efficiency in the operational frequency bands, and low noise.

In one embodiment, a geostationary satellite 105 is configured to receive the signals from the location of antenna 110 and within the frequency band and specific polarization transmitted. The satellite 105 may, for example, use a reflector antenna, lens antenna, array antenna, active antenna, or other mechanism known in the art for reception of such signals. The satellite 105 may process the signals received from the gateway 115 and forward the signal from the gateway 115 containing the MAC frame to one or more subscriber terminals 130. In one embodiment, the satellite 105 operates in a multi-beam mode, transmitting a number of narrow beams each directed at a different region of the earth, allowing for frequency re-use. With such a multibeam satellite 105, there may be any number of different signal switching configurations on the satellite, allowing signals from a single gateway 115 to be switched between different spot beams. In one embodiment, the satellite 105 may be configured as a "bent pipe" satellite, wherein the satellite may frequency convert the received carrier signals before retransmitting these signals to their destination, but otherwise perform little or no other processing on the contents of the signals. A variety of physical layer transmission modulation and coding techniques may be used by the satellite 105 in accordance with certain embodiments of the invention, including those defined with the DVB-S2 and WiMAX standards. For other embodiments a number of configurations are possible (e.g., using LEO satellites, or using a mesh network instead of a star network), as evident to those skilled in the art.

The service signals transmitted from the satellite 105 may be received by one or more subscriber terminals 130, via the respective subscriber antenna 125. In one embodiment, the antenna 125 and terminal 130 together comprise a very small aperture terminal (VSAT), with the antenna 125 measuring approximately 0.6 meters in diameter and having approximately 2 watts of power. In other embodiments, a variety of other types of antennas 125 may be used at the subscriber terminal 130 to receive the signal from the satellite 105. The link 150 from the satellite 105 to the subscriber terminals 130 may be referred to hereinafter as the downstream downlink 150. Each of the subscriber terminals 130 may comprise a single user terminal or, alternatively, comprise a hub or router (not pictured) that is coupled to multiple user terminals. Each subscriber terminal 130 may be connected to consumer premises equipment (CPE) 160 comprising, for example computers, local area networks, Internet appliances, wireless networks, etc.

In one embodiment, a Multi-Frequency Time-Division Multiple Access (MF-TDMA) scheme is used for upstream links 140, 145, allowing efficient streaming of traffic while maintaining flexibility in allocating capacity among each of the subscriber terminals 130. In this embodiment, a number of frequency channels are allocated which may be fixed, or which may be allocated in a more dynamic fashion. A Time Division Multiple Access (TDMA) scheme is also employed in each frequency channel. In this scheme, each frequency channel may be divided into several timeslots that can be assigned to a connection (i.e., a subscriber terminal 130). In other embodiments, one or more of the upstream links 140, 145 may be configured with other schemes, such as Frequency Division Multiple Access (FDMA), Orthogonal Frequency Division Multiple Access (OFDMA), Code Division Multiple Access (CDMA), or any number of hybrid or other schemes known in the art.

A subscriber terminal, for example 130-a, may transmit data and information to a network 120 destination via the satellite 105. The subscriber terminal 130 transmits the signals via the upstream uplink 145-a to the satellite 105 using the antenna 125-a. A subscriber terminal 130 may transmit the signals according to a variety of physical layer transmission modulation and coding techniques, including those defined with the DVB-S2 and WiMAX standards. In various embodiments, the physical layer techniques may be the same for each of the links 135, 140, 145, 150, or may be different. The link from the satellite 105 to the gateway 115 may be referred to hereinafter as the upstream downlink 140.

Figure 1B:
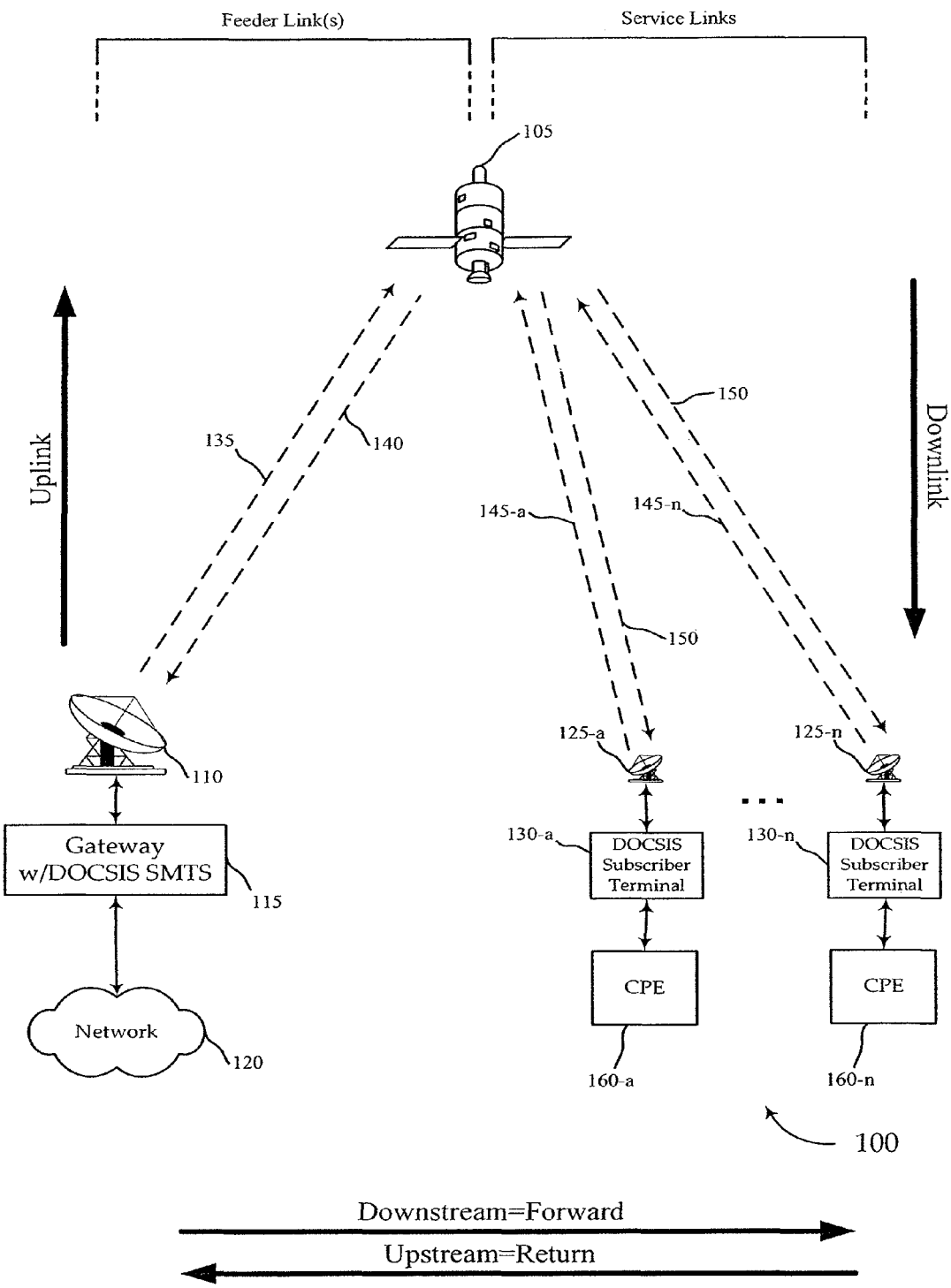

Turning to FIG. 1B, a block diagram is shown illustrating an alternative embodiment of a satellite communication system 100. This communication system 100 may, for example, comprise the system 100 of FIG. 1A, but is in this instance described with greater particularity. In this embodiment, the gateway 115 includes a Satellite Modem Termination System (SMTS), which is based at least in part on the Data-Over-Cable Service Interface Standard (DOCSIS). The SMTS in this embodiment includes a bank of modulators and demodulators for transmitting signals to and receiving signals from subscriber terminals 130. The SMTS in the gateway 115 performs the real-time scheduling of the signal traffic through the satellite 105, and provides the interfaces for the connection to the network 120.

In this embodiment, the subscriber terminals 135 use portions of DOCSIS-based modem circuitry, as well. Therefore, DOCSIS-based resource management, protocols, and schedulers may be used by the SMTS for efficient provisioning of messages. DOCSIS-based components may be modified, in various embodiments, to be adapted for use therein. Thus, certain embodiments may utilize certain parts of the DOCSIS specifications, while customizing others.

While a satellite communications system 100 applicable to various embodiments of the invention is broadly set forth above, a particular embodiment of such a system 100 will now be described. In this particular example, approximately 2 gigahertz (GHz) of bandwidth is to be used, comprising four 500 megahertz (MHz) bands of contiguous spectrum. Employment of dual-circular polarization results in usable frequency comprising eight 500 MHz non-overlapping bands with 4 GHz of total usable bandwidth. This particular embodiment employs a multi-beam satellite 105 with physical separation between the gateways 115 and subscriber spot beams, and configured to permit reuse of the frequency on the various links 135, 140, 145, 150. A single Traveling Wave Tube Amplifier (TWTA) is used for each service link spot beam on the downstream downlink, and each TWTA is operated at full saturation for maximum efficiency. A single wideband carrier signal, for example using one of the 500 MHz bands of frequency in its entirety, fills the entire bandwidth of the TWTA, thus allowing a minimum number of space hardware elements. Spotbeam size and TWTA power may be optimized to achieve maximum flux density on the earth's surface of −118 decibel-watts per meter squared per megahertz (dbW/m$^2$/MHz). Thus, using approximately 2 bits per second per hertz (bits/s/Hz), there is approximately 1 Gbps of available bandwidth per spot beam.

Figure 12A:
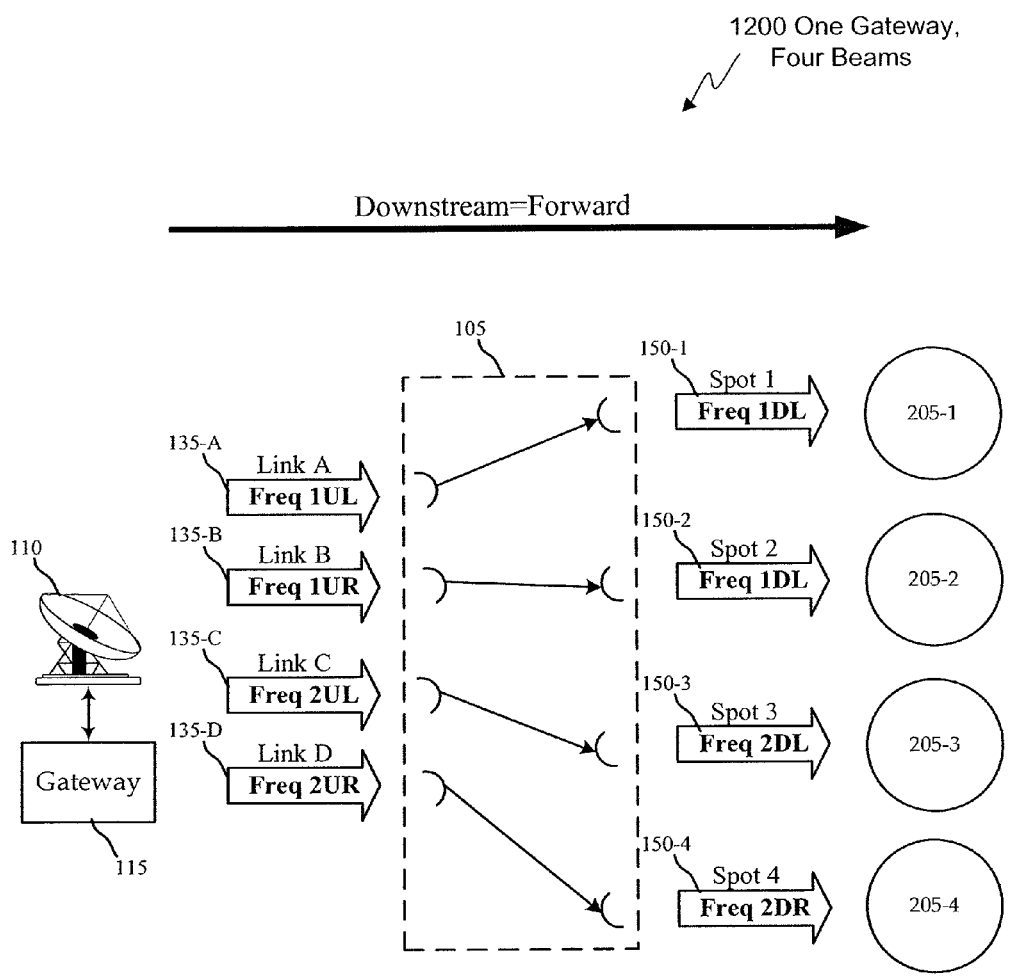
FIGS. 12A and 12B are diagrams illustrating frequency allocation of a gateway.

With reference to FIG. 12A, an embodiment of a forward link distribution system 1200 is shown. The gateway 115 is shown coupled to an antenna 110, which generates four downstream signals. A single carrier with 500 MHz of spectrum is used for each of the four downstream uplinks 135. In this embodiment, a total of two-frequencies and two polarizations allow four separate downstream uplinks 135 while using only 1 GHz of the spectrum. For example, link A 135-A could be Freq 1 U (27.5-28.0 GHz) with left-hand polarization, link B 135-B could be Freq 1 U (27.5-28.0) GHz with right-hand polarization, link C could be Freq 2 U (29.5-30 GHz) with left-hand polarization, and link D could be Freq 2 U (29.5-30 GHz) with left-hand polarization.

The satellite 105 is functionally depicted as four "bent pipe" connections between a feeder and service link. Carrier signals can be changed through the satellite 105 "bent pipe" connections along with the orientation of polarization. The satellite 105 converts each downstream uplink 135 signal into a downstream downlink signal 150.

In this embodiment, there are four downstream downlinks 150 that each provides a service link for four spot beams 205. The downstream downlink 150 may change frequency in the bent pipe as is the case in this embodiment. For example, downstream uplink A 135-A changes from a first frequency (i.e., Freq 1 U) to a second frequency (i.e., Freq 1 D) through the satellite 105. Other embodiments may also change polarization between the uplink and downlink for a given downstream channel. Some embodiments may use the same polarization and/or frequency for both the uplink and downlink for a given downstream channel.

Figure 12B:
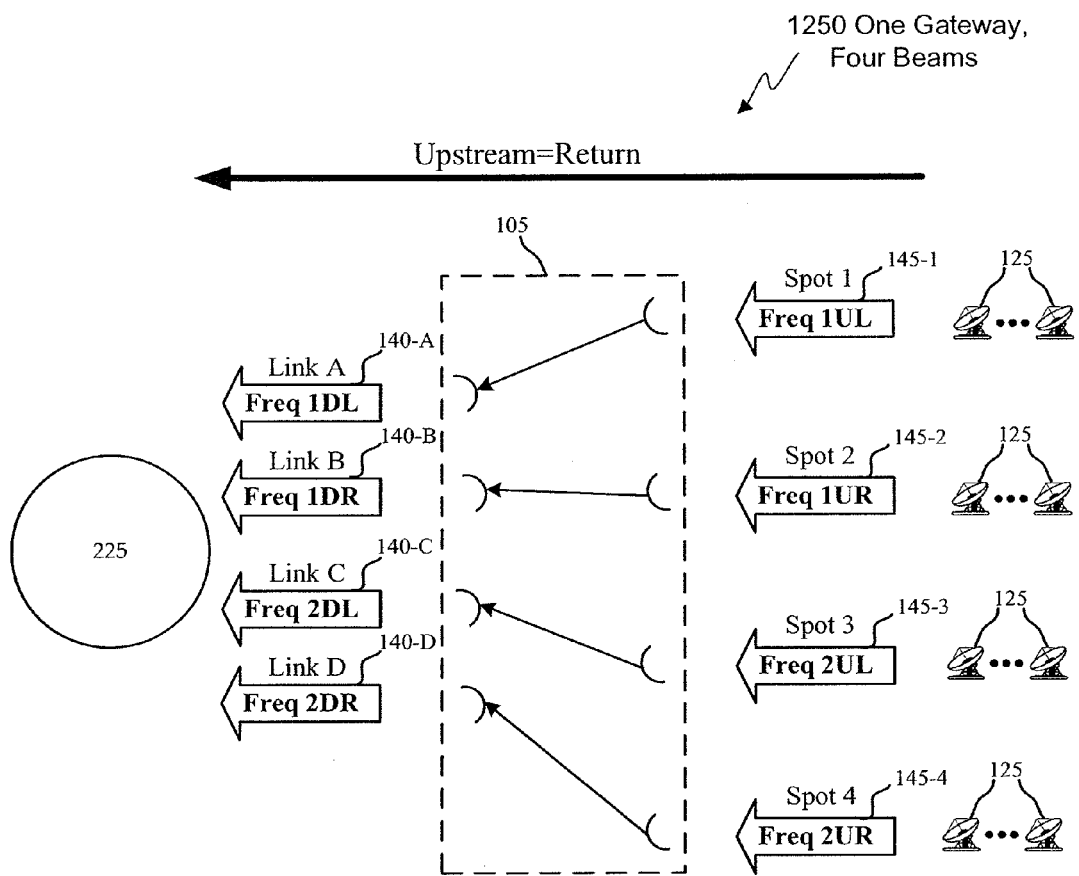

Referring next to FIG. 12B, an embodiment of a return link distribution system is shown. This embodiment shows four upstream uplinks 145 from four sets of subscriber terminals 125. A "bent pipe" satellite 105 takes the upstream uplinks 145, optionally changes carrier frequency and/or polarization (not shown), and then redirects them as upstream downlinks 140 to a spot beam for a gateway 115. In this embodiment, the carrier frequency changes between the uplink 145 and the downlink 140, but the polarization remains the same. Because the feeder spot beams to the gateway 115 is not in the coverage area of the service beams, the same frequency pairs may be reused for both service links and feeder links.

Figure 2A:
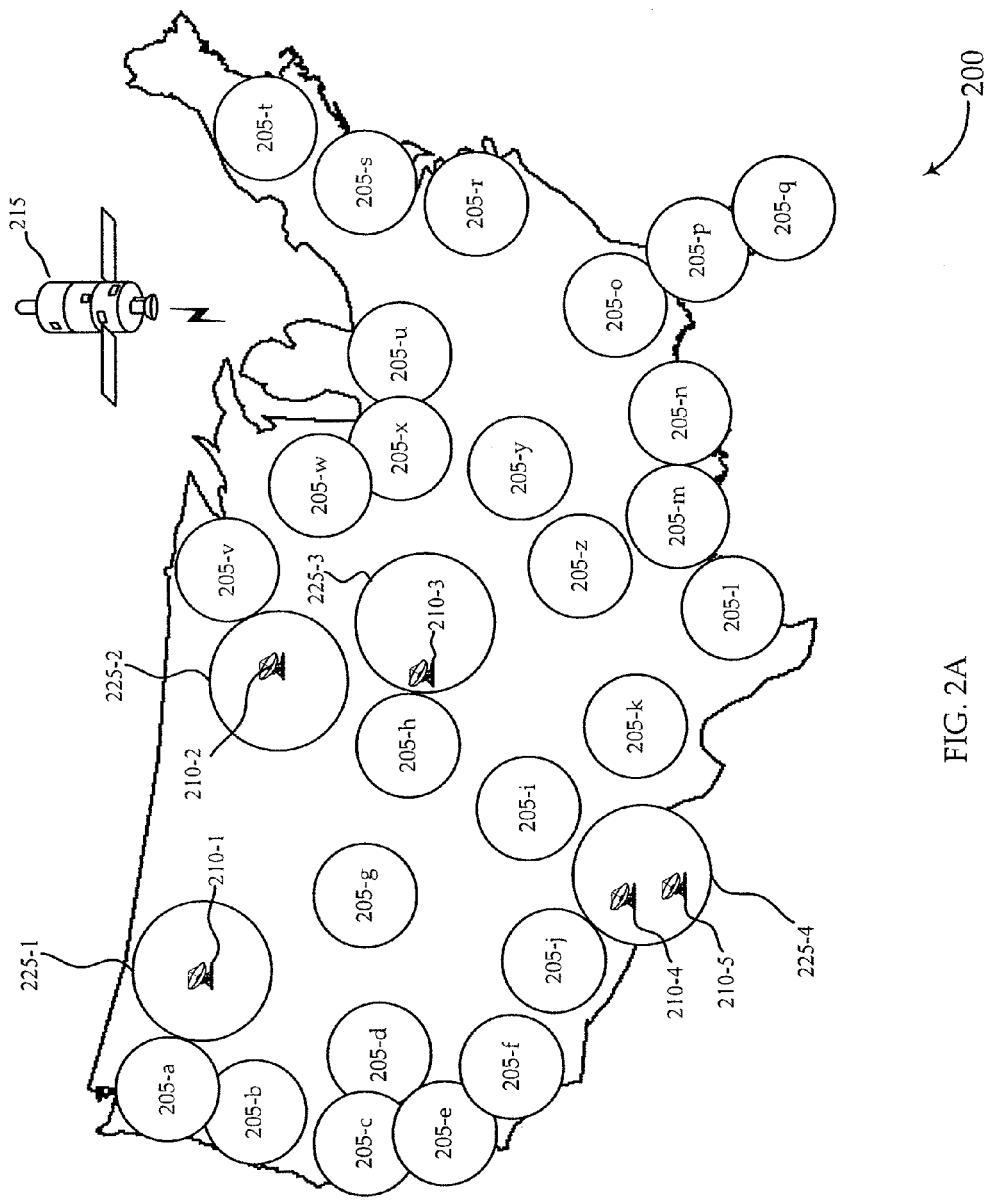
FIGS. 2A and 2B are maps showing geographical distributions of beams.
Figure 2B:
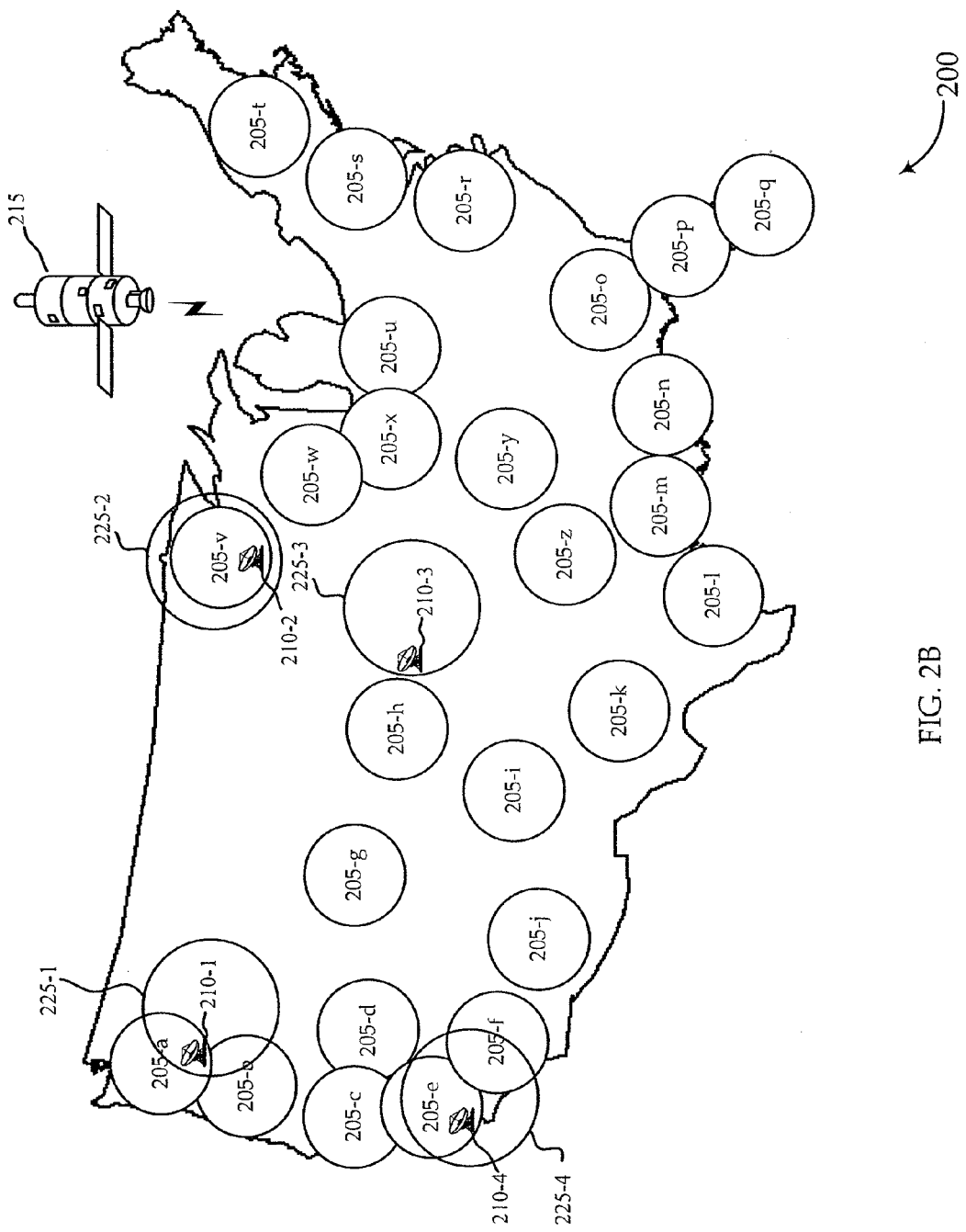

Turning to FIGS. 2A and 2B, examples of a multi-beam system 200 configured according to various embodiments of the invention are shown. The multi-beam system 200 may, for example, be implemented in the network 100 described in FIGS. 1A and 1B. Shown are the coverage of a number of feeder and service spot beam regions 225, 205. In this embodiment, a satellite 215 reuses frequency bands by isolating antenna directivity to certain regions of a country (e.g., United States, Canada or Brazil). As shown in FIG. 2A, there is complete geographic exclusivity between the feeder and service spot beams 205, 225. But that is not the case for FIG. 2B where there may in some instances be service spot beam overlap (e.g., 205-c, 205-d, 205-e), while there is no overlap in other areas. However, with overlap, there are certain interference issues that may inhibit frequency band re-use in the overlapping regions. A four color pattern allows avoiding interference even where there is some overlap between neighboring service beams 205.

In this embodiment, the gateway terminals 210 are also shown along with their feeder beams 225. As shown in FIG. 2B, the gateway terminals 210 may be located in a region covered by a service spotbeam (e.g., the first, second and fourth gateways 210-1, 210-2, 210-4). However, a gateway may also be located outside of a region covered by a service spotbeam (e.g., the third gateway 210-3). By locating gateway terminals 210 outside of the service spotbeam regions (e.g., the third gateway 210-3), geographic separation is achieved to allow for re-use of the allocated frequencies.

There are often spare gateway terminals 210 in a given feeder spot beam 225. The spare gateway terminal 210-5 can substitute for the primary gateway terminal 210-4 should the primary gateway terminal 210-4 fail to function properly. Additionally, the spare can be used when the primary is impaired by weather.

Figure 8:
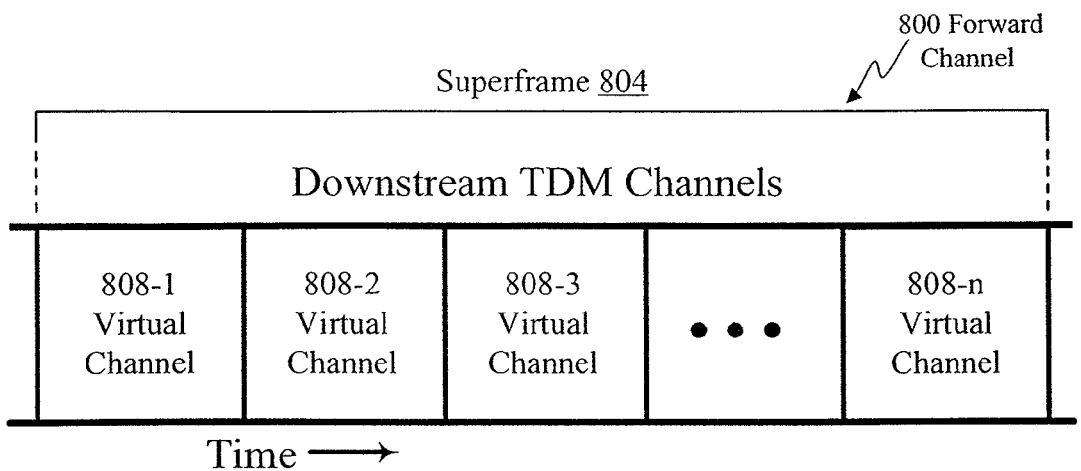
FIG. 8 is a timing diagram of a forward channel superframe.

Referring next to FIG. 8, an embodiment of a downstream channel 800 is shown. The downstream channel 800 includes a series of superframes 804 in succession, where each superframe 804 may have the same size or may vary in size. This embodiment divides a superframe 804 into a number of virtual channels 808(1-n). The virtual channels 808(1-n) in each superframe 804 can be the same size or different sizes. The size of the virtual channels 808(1-n) can change between different superframes 804. Different coding can be optionally used for the various virtual channels 808 (1-n). In some embodiments, the virtual channels are as short as one symbol in duration.

Figure 9:
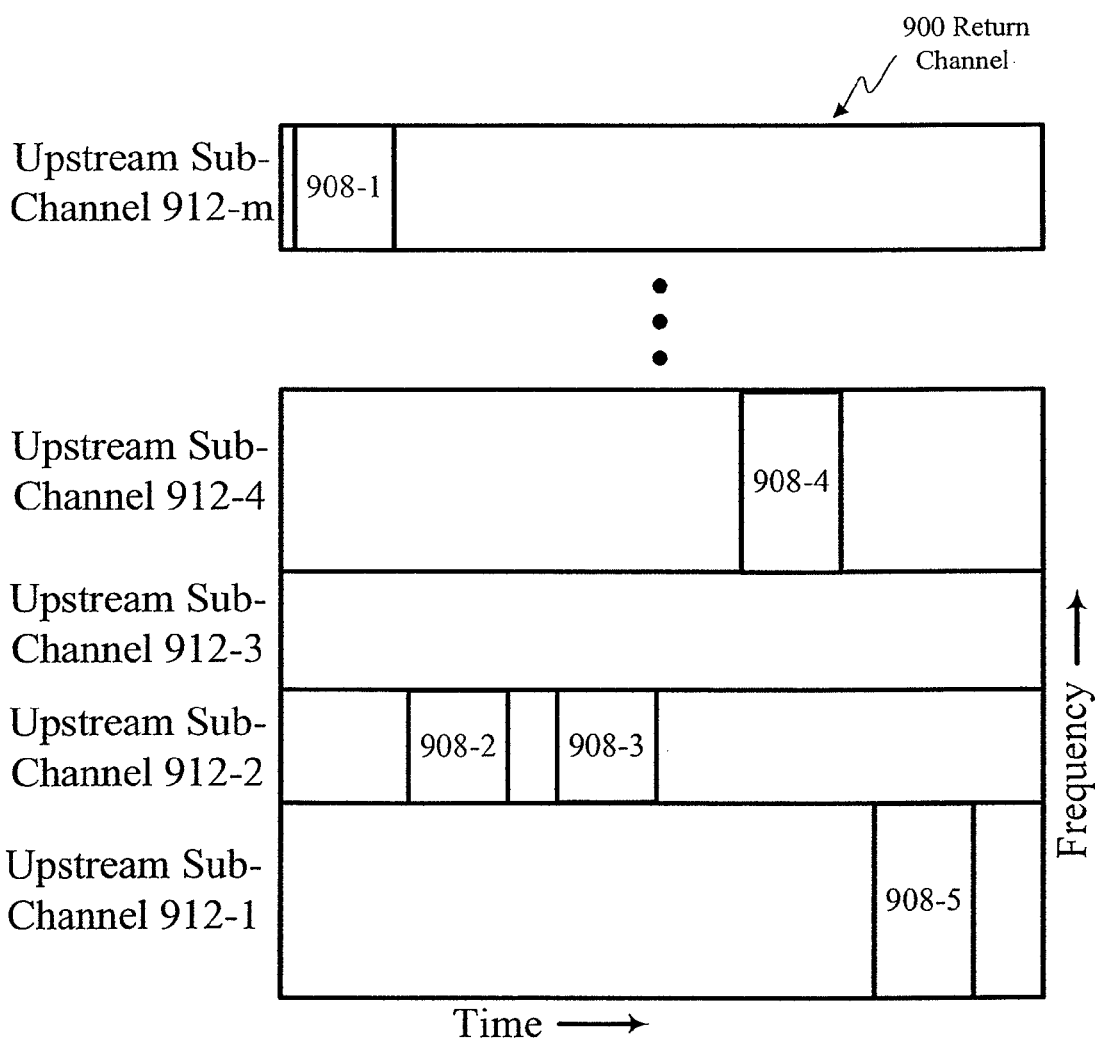
FIG. 9 is a timing diagram of a typical return channel superframe.

With reference to FIG. 9, an embodiment of an upstream channel 900 is shown. This embodiment use MF-TDMA, but other embodiments can use CDMA, OFDM, or other access schemes. The upstream channel 900 has 500 MHz of total bandwidth in one embodiment. The total bandwidth is divided into m frequency sub-channels, which may differ in bandwidth, modulation, coding, etc. and may also vary in time based on system needs.

In this embodiment, each subscriber terminal 130 is given a two-dimensional (2D) map to use for its upstream traffic. The 2D map has a number of entries where each indicates a frequency sub-channel 912 and time segment 908(1-5). For example, one subscriber terminal 130 is allocated sub-channel m 912-m, time segment one 908-1; sub-channel two 912-2, time segment two 908-2; sub-channel two 912-2, time segment three 908-3; etc. The 2D map is dynamically adjusted for each subscriber terminal 130 according to anticipated need by a scheduler in the SMTS.

Figure 13:
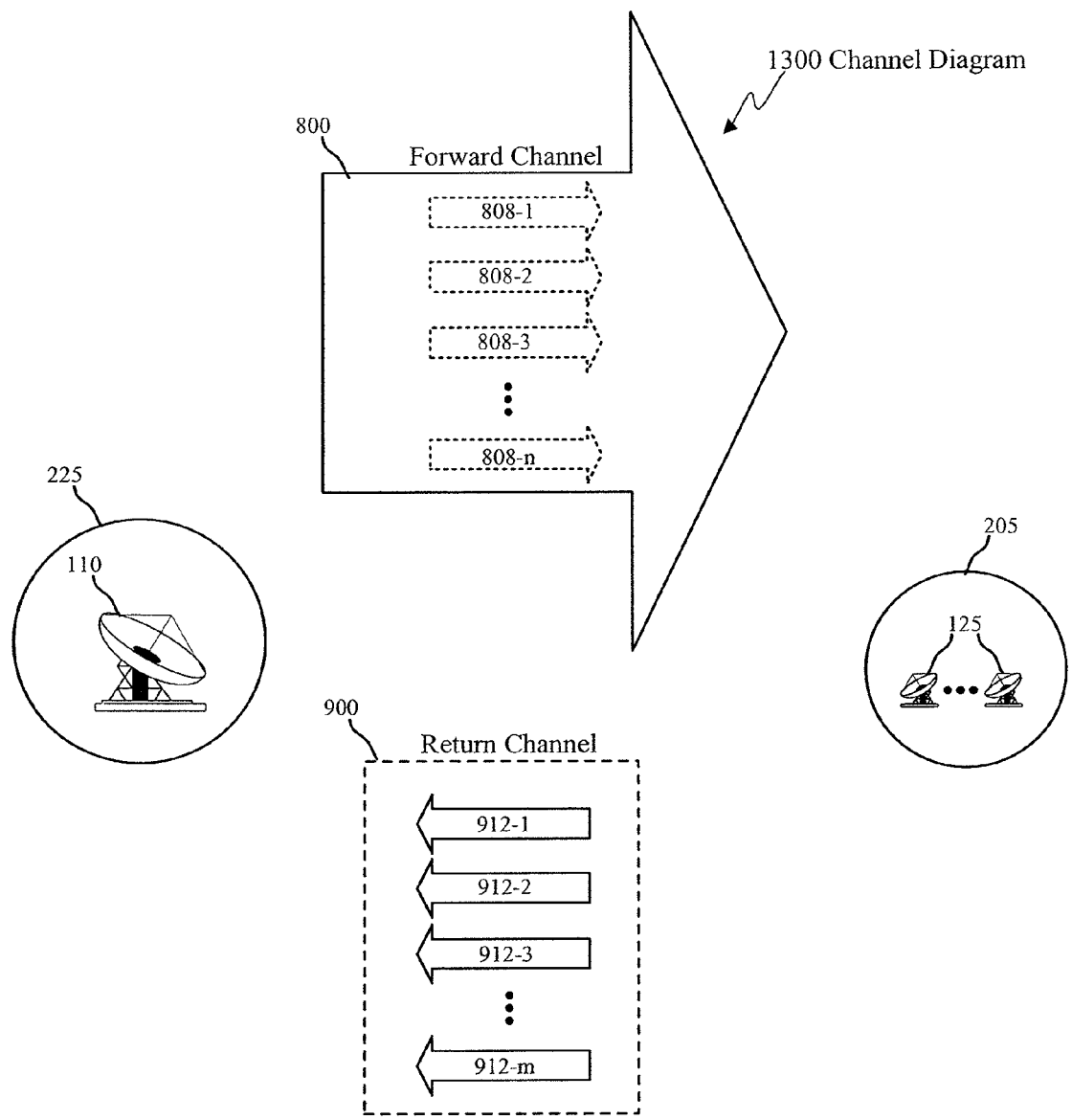
FIG. 13 is a block diagram of a forward channel and return channels in a relay satellite.

Referring to FIG. 13, an embodiment of a channel diagram is shown. Only the channels for a single feeder spot beam 225 and a single service spot beam 205 are shown, but embodiments include many of each spot beam 225, 205 (e.g., various embodiments could have 60, 80, 100, 120, etc. of each type of spot beam 225, 205). The forward channel 800 includes n virtual channels 808 traveling from the gateway antenna 110 to the service spot beam 205. Each subscriber terminal 130 may be allocated one or more of the virtual channels 808. m MF-TDMA channels 912 make up the return channel 900 between the subscriber terminal (ST) antennas 125 and the feeder spot beam 225.

Figure 3:
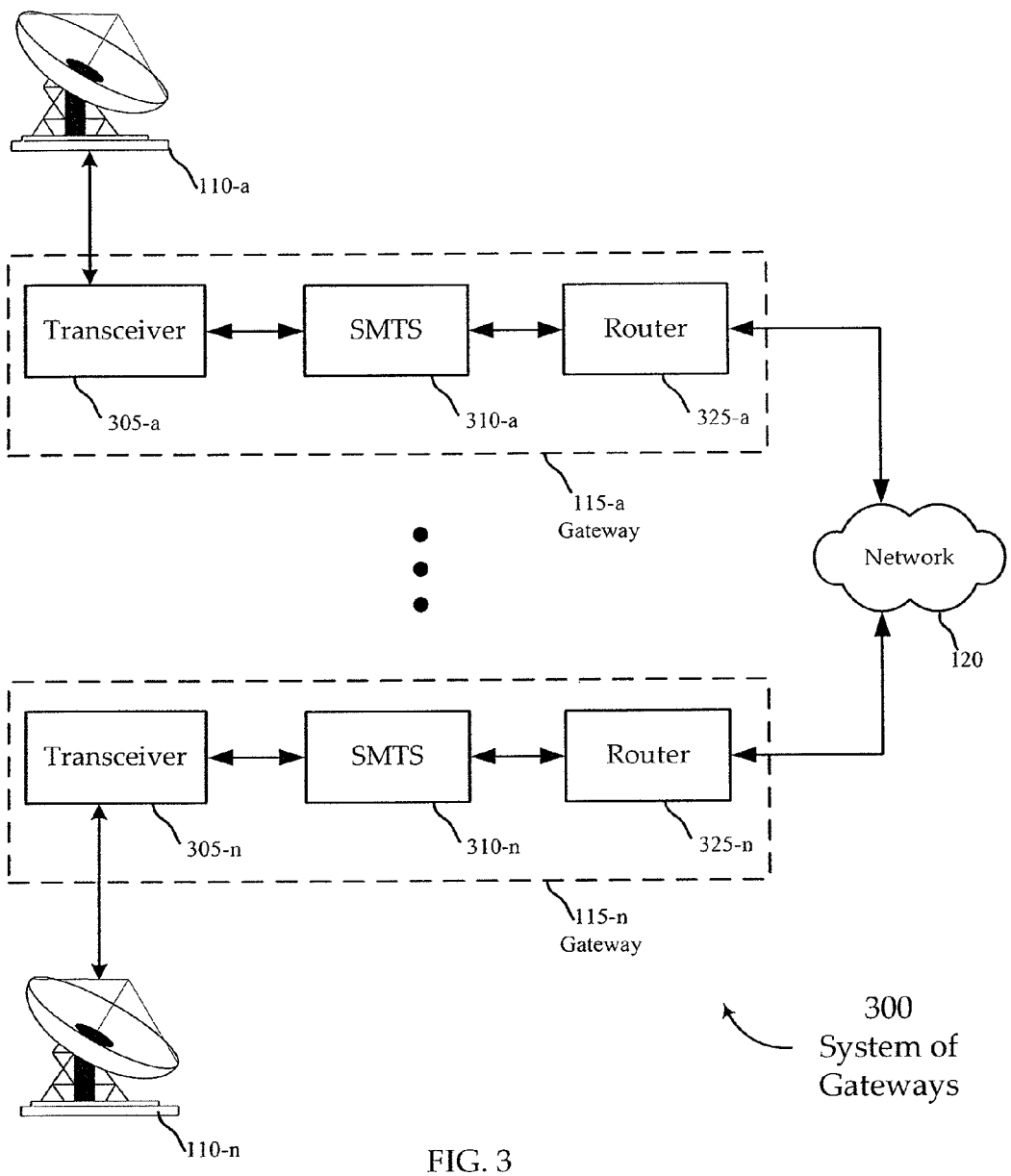
FIG. 3 is a block diagram of a gateway system.

Referring next to FIG. 3, an embodiment of a ground system 300 of gateways 115 is shown in block diagram form. One embodiment could have fifteen active gateways 115 (and possibly spares) to generate sixty service spot beams, for example. The ground system 300 includes a number of gateways 115 respectively coupled to antennas 110. All the gateways 115 are coupled to a network 120 such as the Internet. The network is used to gather information for the subscriber terminals. Additionally, each SMTS communicates with other SMTS and the Internet using the network 120 or other means not shown.

Each gateway 115 includes a transceiver 305, a SMTS 310 and a router 325. The transceiver 305 includes both a transmitter and a receiver. In this embodiment, the transmitter takes a baseband signal and upconverts and amplifies the baseband signal for transmission of the downstream uplinks 135 with the antenna 110. The receiver downconverts and tunes the upstream downlinks 140 along with other processing as explained below. The SMTS 310 processes signals to allow the subscriber terminals to request and receive information and schedules bandwidth for the forward and return channels 800, 900. Additionally, the SMTS 310 provides configuration information and receives status from the subscriber terminals 130. Any requested or returned information is forwarded via the router 325.

Figure 11:
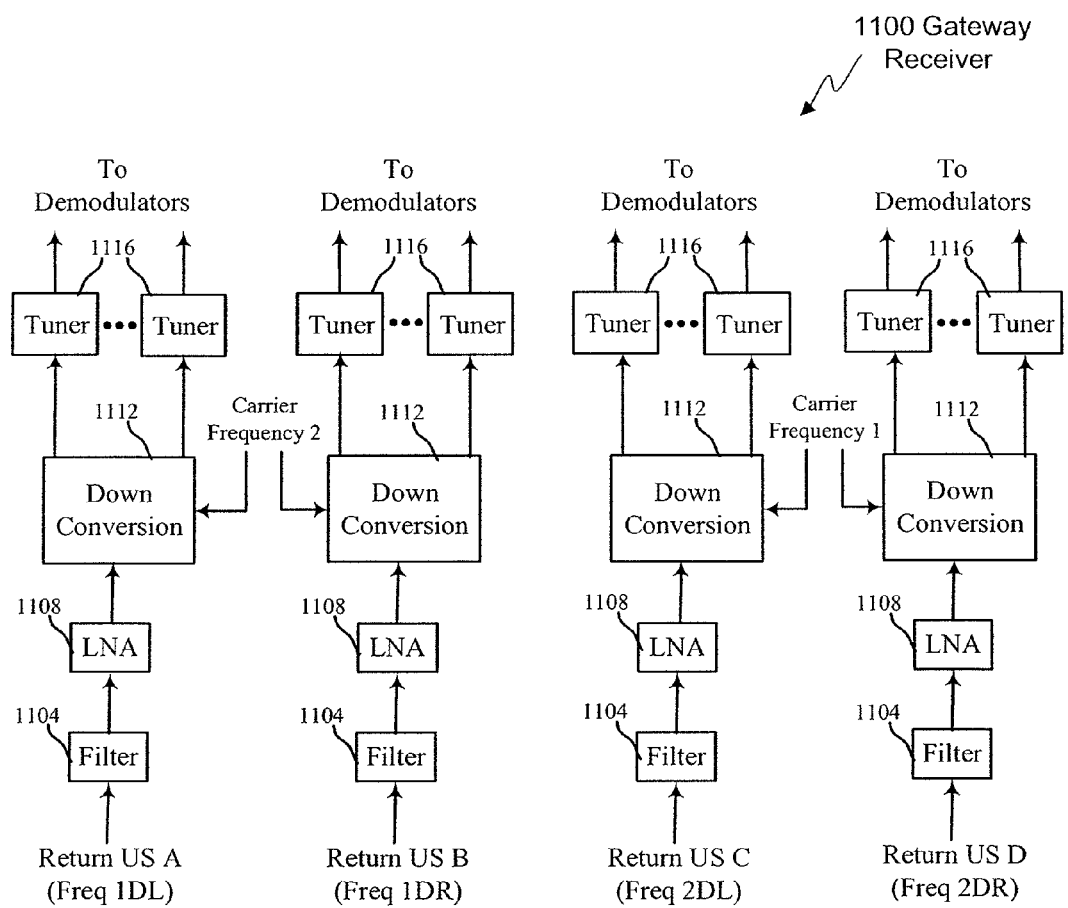
FIG. 11 is a block diagram of a gateway receiver.

With reference to FIG. 11, an embodiment of gateway receiver 1100 is shown. This embodiment of the receiver 1100 processes four return channels 900 from four different service spot beams 205. The return channels 900 may be divided among four pathways using antenna polarization and/or filtering 1104. Each return channel is coupled to a low-noise amplifier (LNA) 1108. Down conversion 1112 mixes down the signal into its intermediate frequency. Each of the upstream sub-channels 912 is separated from the signal by a number of tuners 1116. Further processing is performed in the SMTS 310.

Figure 10:
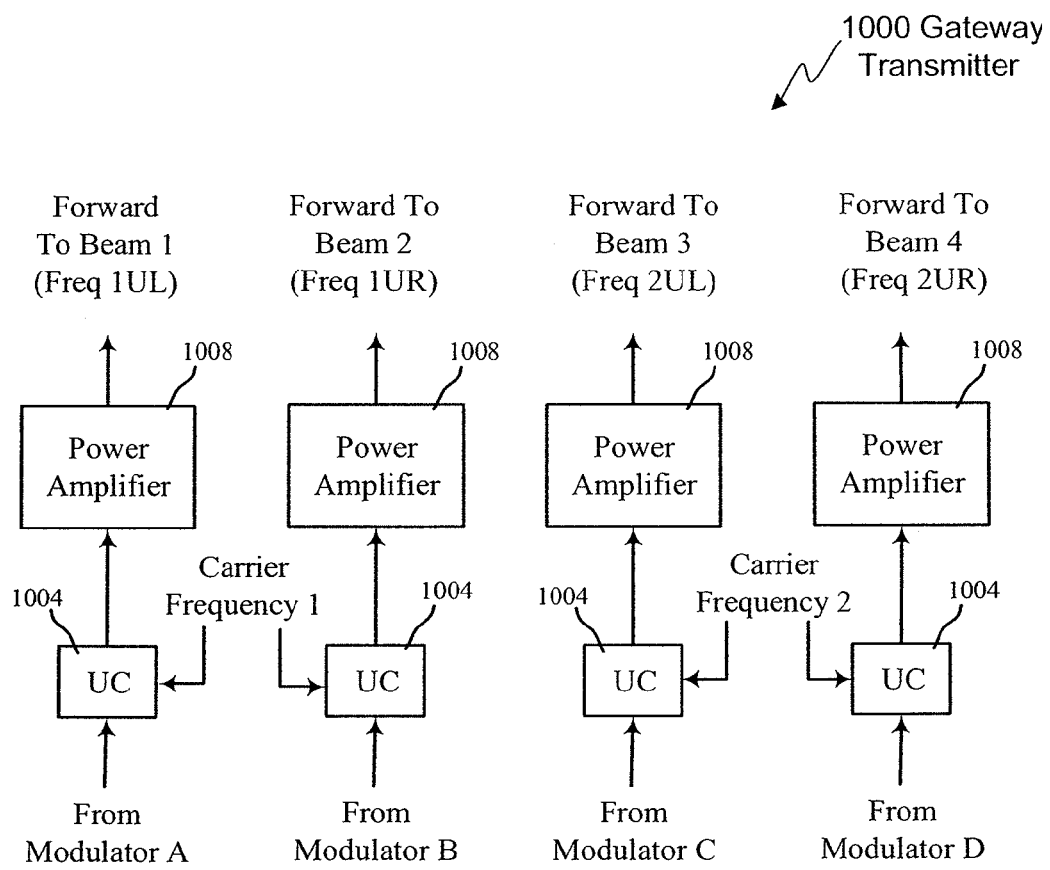
FIG. 10 is a block diagram of a gateway transmitter.

Referring next to FIG. 10, an embodiment of a gateway transmitter 1000 is shown. The downstream channels 800 are received at their intermediate frequencies from the SMTS 310. With separate pathways, each downstream channel 800 is up-converted 1004 using two different carrier frequencies. A power amplifier 1008 increases the amplitude of the forward channel 900 before coupling to the antenna 110. The antenna 110 polarizes the separate signals to keep the four forward channels 800 distinct as they are passed to the satellite 105.

Figure 4:
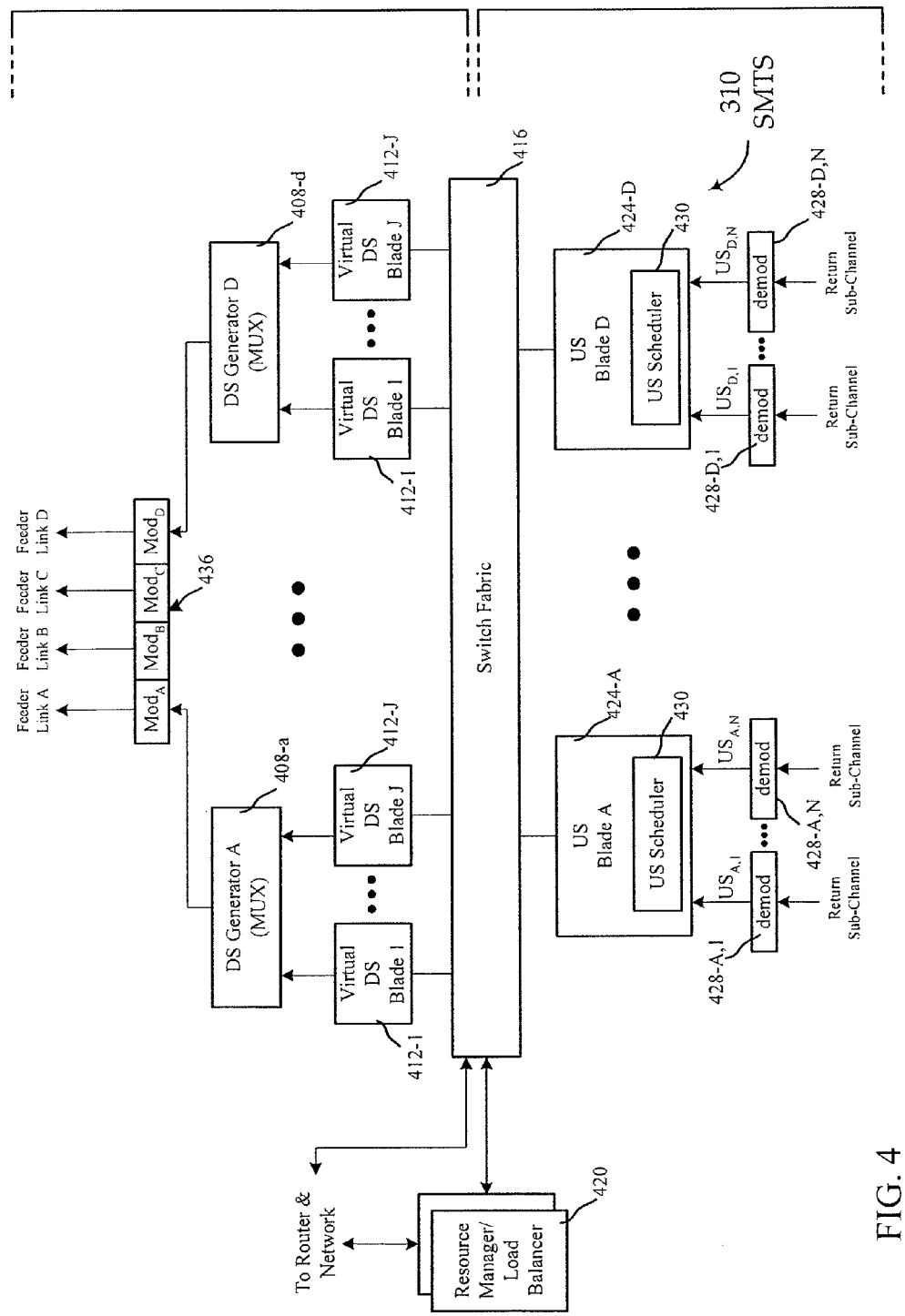
FIG. 4 is a block diagram of a control system.

With reference to FIG. 4, an embodiment of a SMTS 310 is shown in block diagram form. Baseband processing is done for the inbound and outbound links 135, 140 by a number of geographically separated gateways 115. Each SMTS 310 is generally divided into two sections, specifically, the downstream portion 305 to send information to the satellite 105 and the upstream portion 315 to receive information from the satellite 105.

The downstream portion 305 takes information from the switching fabric 416 through a number of downstream (DS) blades 412. The DS blades 412 are divided among a number of downstream generators 408. This embodiment includes four downstream generators 408, with one for each of the downstream channels 800. For example, this embodiment uses four separate 500 MHz spectrum ranges having different frequencies and/or polarizations. A four-color modulator 436 has a modulator for each respective DS generator 408. The modulated signals are coupled to the transmitter portion 1000 of the transceiver 305 at an intermediate frequency. Each of the four downstream generators 408 in this embodiment has J virtual DS blades 412.

The upstream portion 315 of the SMTS 310 receives and processes information from the satellite 105 in the baseband intermediate frequency. After the receiver portion 1100 of the transceiver 305 produces all the sub-channels 912 for the four separate baseband upstream signals, each sub-channel 912 is coupled to a different demodulator 428. Some embodiments could include a switch before the demodulators 428 to allow any return link sub-channel 912 to go to any demodulator 428 to allow dynamic reassignment between the four return channels 908. A number of demodulators are dedicated to an upstream (US) blade 424.

The US blades 424 serve to recover the information received from the satellite 105 before providing it to the switching fabric 416. The US scheduler 430 on each US blade 424 serves to schedule use of the return channel 900 for each subscriber terminal 130. Future needs for the subscriber terminals 130 of a particular return channel 900 can be assessed and bandwidth/latency adjusted accordingly in cooperation with the Resource Manager and Load Balancer (RM/LB) block 420.

The RM/LB block 420 assigns traffic among the US and DS blades. By communication with other RM/LB blocks 420 in other SMTS's 310, each RM/LB block 420 can reassign subscriber terminals 130 and channels 800, 900 to other gateways 115. This reassignment can take place for any number of reasons, for example, lack of resources and/or loading concerns. In this embodiment, the decisions are done in a distributed fashion among the RM/LB blocks 420, but other embodiments could have decisions made by one master MR/LB block or at some other central decision-making authority. Reassignment of subscriber terminals 130 could use overlapping service spot beams 205, for example.

Figure 5:
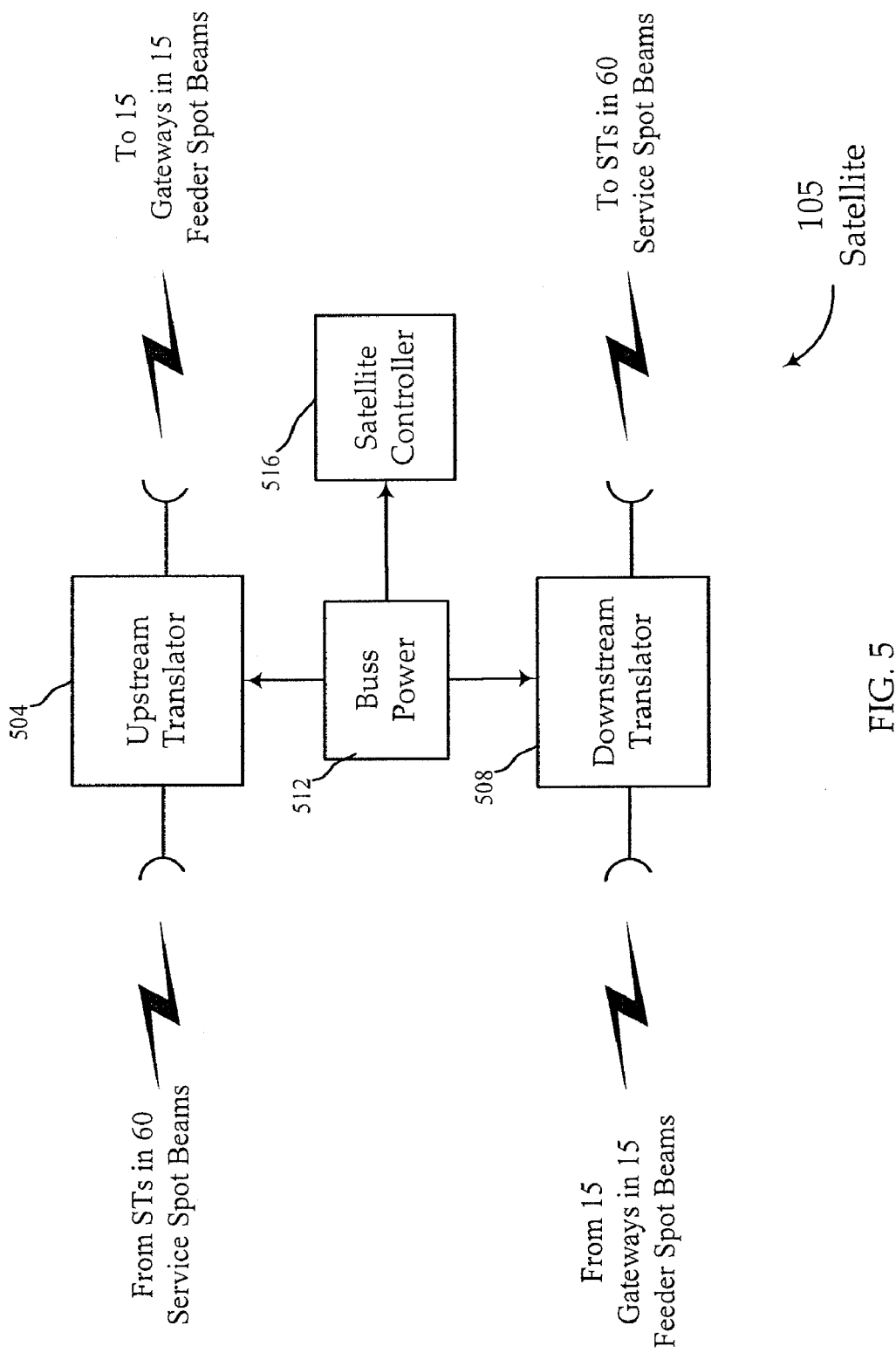
FIG. 5 is a block diagram of communication and control elements of a satellite relay.

Referring next to FIG. 5, an embodiment of a satellite 105 is shown in block diagram form. The satellite 105 in this embodiment communicates with fifteen gateways 115 and all STs 130 using sixty feeder and service spot beams 225, 205. Other embodiments could use more or less gateways/spot beams. Bus power 512 is supplied using a power source such as chemical fuel, nuclear fuel and/or solar energy. A satellite controller 516 is used to maintain attitude and otherwise control the satellite 105. Software updates to the satellite 105 can be uploaded from the gateway 115 and performed by the satellite controller 516.

Information passes in two directions through the satellite 105. A downstream translator 508 receives information from the fifteen gateways 115 for relay to subscriber terminals 130 using sixty service spot beams 205. An upstream translator 504 receives information from the subscriber terminals 130 occupying the sixty spot beam areas and relays that information to the fifteen gateways 115. This embodiment of the satellite can switch carrier frequencies in the downstream or upstream processors 508, 504 in a "bent-pipe" configuration, but other embodiments could do baseband switching between the various forward and return channels 800, 900. The frequencies and polarization for each spot beam 225, 205 could be programmable or preconfigured.

Figure 6A:
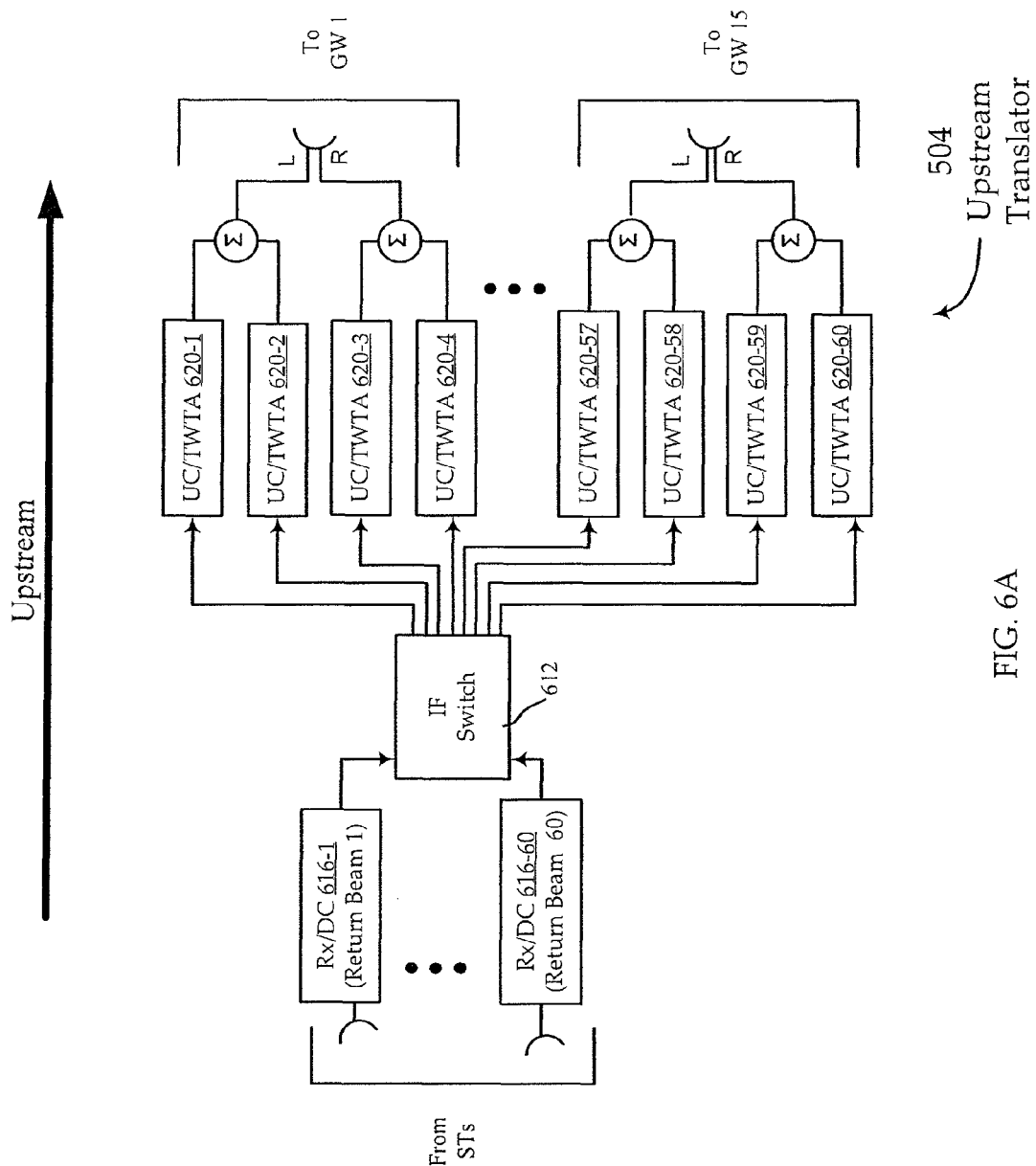
FIGS. 6A and 6B are block diagrams of upstream and downstream translators of FIG. 5.

With reference to FIG. 6A, an embodiment of an upstream translator 504 is shown in block diagram form. A Receiver and Downconverter (Rx/DC) block 616 receives all the return link information for the area defined by a spot beam 205 as an analog signal before conversion to an intermediate frequency (IF). There is a Rx/DC block 616 for each service spot beam area 205. An IF switch 612 routes a particular baseband signal from a Rx/DC block 616 to a particular upstream downlink channel. The upstream downlink channel is filled using an Upconverter and Traveling Wave Tube Amplifier (UC/TWTA) block 620. The frequency and/or polarization can be changed through this process such that each upstream channel passes through the satellite 105 in a bent pipe fashion.

Each gateway 115 has four dedicated UC/TWTA blocks 620 in the upstream translator 504. Two of the four dedicated UC/TWTA blocks 620 operate at a first frequency range and two operate at a second frequency range in this embodiment. Additionally, two use right-hand polarization and two use left-hand polarization. Between the two polarizations and two frequencies, the satellite 105 can communicate with each gateway 115 with four separate upstream downlink channels.

Figure 6B:
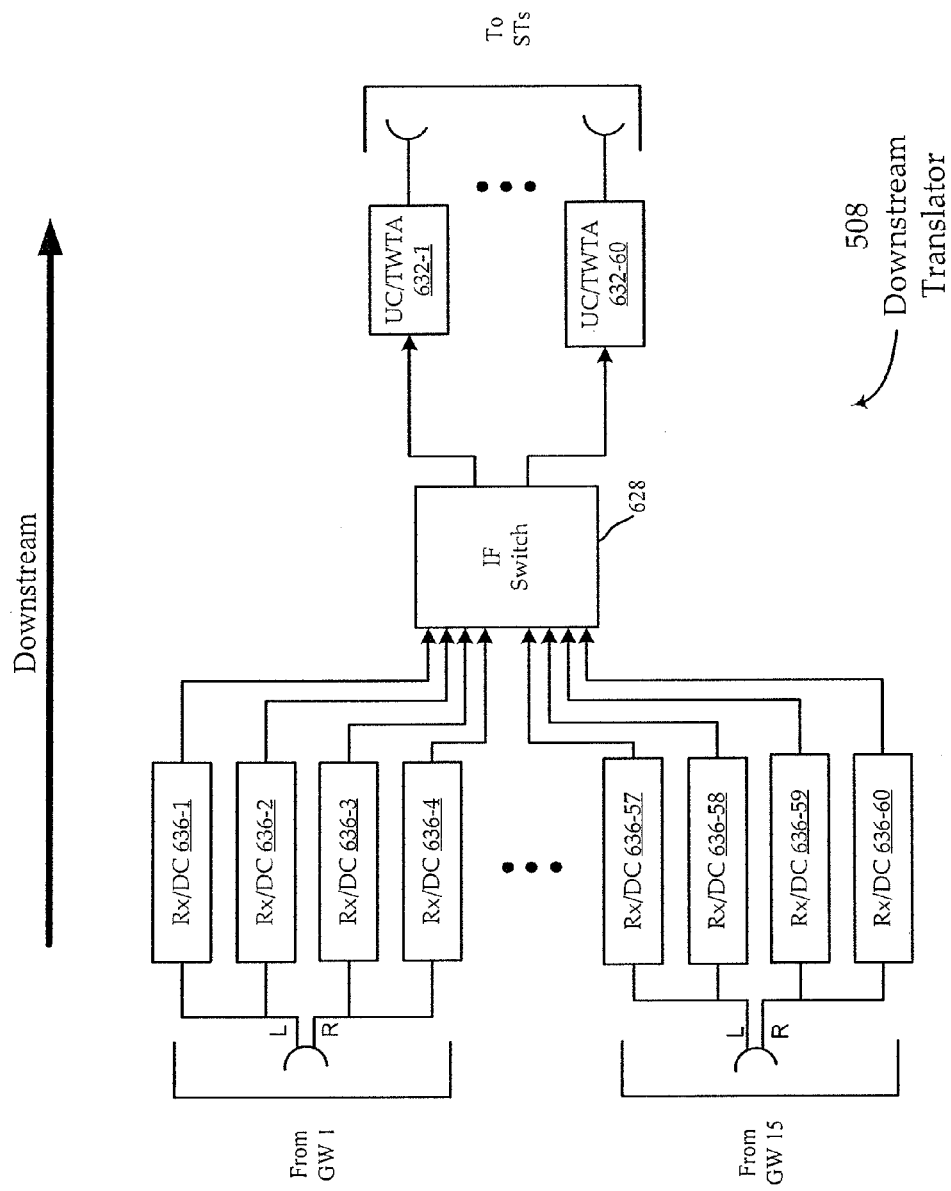

Referring next to FIG. 6B, an embodiment of a downstream translator 508 is shown as a block diagram. Each gateway 115 has four downstream uplink channels to the satellite 105 by use of two frequency ranges and two polarizations. A Rx/DC block 636 takes the analog signal and converts the signal to an intermediate frequency. There is a Rx/DC block 636 for all sixty downstream uplink channels from the fifteen gateways 115. The IF switch 612 connects a particular channel 800 from a gateway 115 to a particular service spot beam 205. Each IF signal from the switch 628 is modulated and amplified with a UC/TWTA block 632. An antenna broadcasts the signal using a spot beam to subscriber terminals 130 that occupy the area of the spot beam. Just as with the upstream translator 504, the downstream translator 508 can change carrier frequency and polarization of a particular downstream channel in a bent-pipe fashion.

Figure 7:
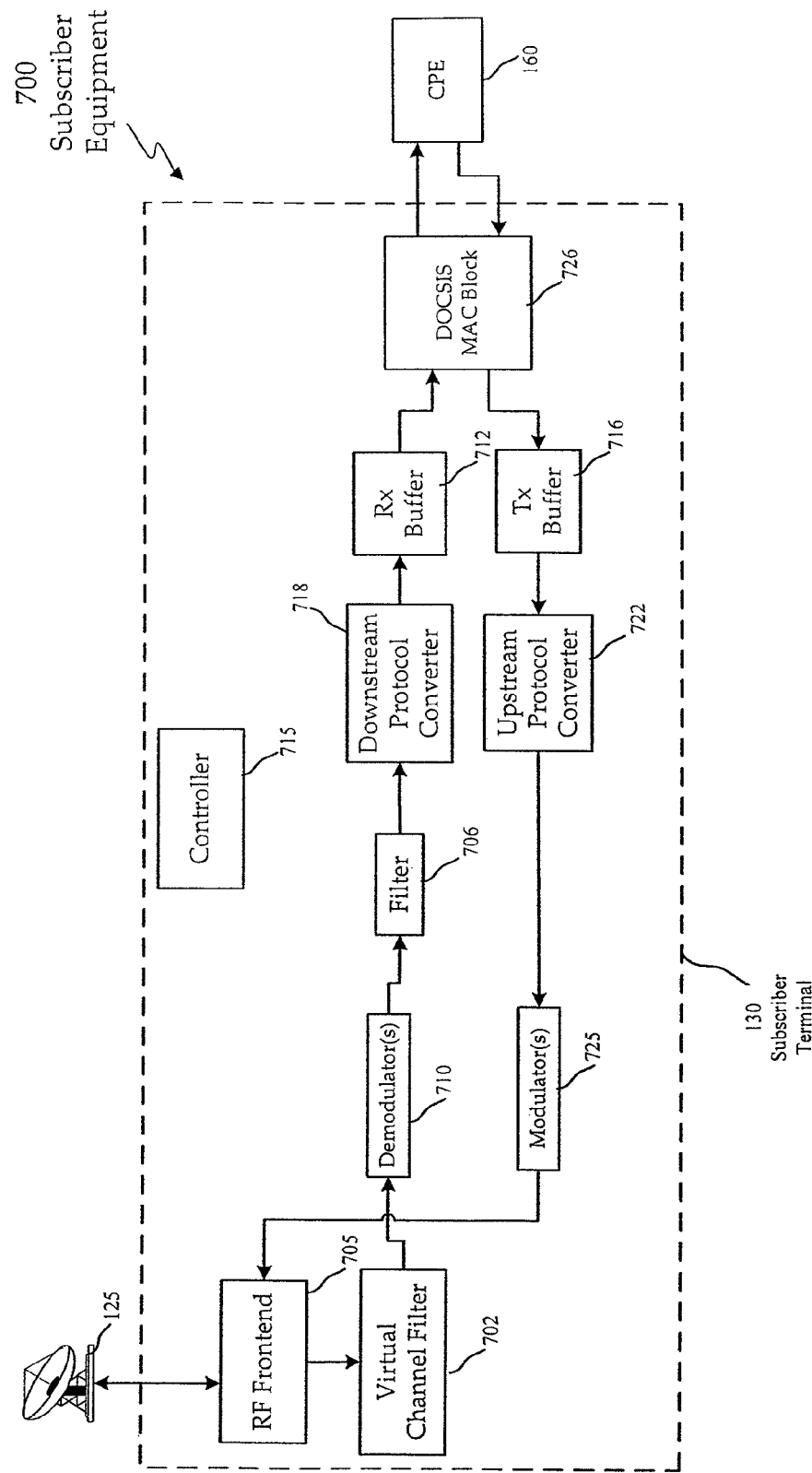
FIG. 7 is a block diagram of a subscriber facility with a subscriber terminal.

FIG. 7 comprises a block diagram illustrating a set of subscriber equipment 700 which may be located at a subscriber location for the reception and transmission of communication signals. Components of this set of subscriber equipment 700 may, for example, comprise the antenna 125, associated subscriber terminal 130 and any consumer premises equipment (CPE) 160, which may be a computer, a network, etc.

An antenna 125 may receive signals from a satellite 105. The antenna 125 may comprise a VSAT antenna, or any of a variety other antenna types (e.g., other parabolic antennas, microstrip antennas, or helical antennas). In some embodiments, the antenna 125 may be configured to dynamically modify its configuration to better receive signals at certain frequency ranges or from certain locations. From the antenna 125, the signals are forwarded (perhaps after some form of processing) to the subscriber terminal 130. The subscriber terminal 130 may include a radio frequency (RF) front end 705, a controller 715, a virtual channel filter 702, a modulator 725, a demodulator 710, a filter 706, a downstream protocol converter 718, an upstream protocol converter 722, a receive (Rx) buffer 712, and a transmit (Tx) buffer 716.

In this embodiment, the RF front end 705 has both transmit and receive functions. The receive function includes amplification of the received signals (e.g., with a low noise amplifier (LNA)). This amplified signal is then downconverted (e.g., using a mixer to combine it with a signal from a local oscillator (LO)). This downconverted signal may be amplified again with the RF frontend 705, before processing of the superframe 804 with the virtual channel filter 702. A subset of each superframe 804 is culled from the downstream channel 800 by the virtual channel filter 702, for example, one or more virtual channels 808 are filtered off for further processing.

A variety of modulation and coding techniques may be used at the subscriber terminal 130 for signals received from and transmitted to a satellite. In this embodiment, modulation techniques include BPSK, QPSK, 8PSK, 16APSK, 32PSK. In other embodiments, additional modulation techniques may include ASK, FSK, MFSK, and QAM, as well as a variety of analog techniques. The demodulator 710 may demodulate the down-converted signals, forwarding the demodulated virtual channel 808 to a filter 706 to strip out the data intended for the particular subscriber terminal 130 from other information in the virtual channel 808.

Once the information destined for the particular subscriber terminal 130 is isolated, a downstream protocol converter 718 translates the protocol used for the satellite link into one that the DOCSIS MAC block 726 uses. Alternative embodiments could use a WiMAX MAC block or a combination DOCSIS/WiMAX block. A Rx buffer 712 is used to convert the high-speed received burst into a lower-speed stream that the DOCSIS MAC block 726 can process. The DOCSIS MAC block 726 is a circuit that receives a DOCSIS stream and manages it for the CPE 160. Tasks such as provisioning, bandwidth management, access control, quality of service, etc. are managed by the DOCSIS MAC block 726. The CPE can often interface with the DOCSIS MAC block 726 using Ethernet, WiFi, USB and/or other standard interfaces. In some embodiments, a WiMax block 726 could be used instead of a DOCSIS MAC block 726 to allow use of the WiMax protocol.

It is also worth noting that while a downstream protocol converter 718 and upstream protocol converter 722 may be used to convert received packets to DOCSIS or WiMax compatible frames for processing by a MAC block 726, these converters will not be necessary in many embodiments. For example, in embodiments where DOCSIS or WiMax based components are not used, the protocol used for the satellite link may also be compatible with the MAC block 726 without such conversions, and the converters 718, 722 may therefore be excluded.

Various functions of the subscriber terminal 130 are managed by the controller 715. The controller 715 may oversee a variety of decoding, interleaving, decryption, and unscrambling techniques, as known in the art. The controller may also manage the functions applicable to the signals and exchange of processed data with one or more CPEs 160. The CPE 160 may comprise one or more user terminals, such as personal computers, laptops, or any other computing devices as known in the art.

The controller 715, along with the other components of the subscriber terminal 130, may be implemented in one or more Application Specific Integrated Circuits (ASICs), or a general purpose processor adapted to perform the applicable functions. Alternatively, the functions of the subscriber terminal 130 may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The controller may be programmed to access memory unit (not shown). It may fetch instructions and other data from the memory unit, or write data to the memory-unit.

As noted above, data may also be transmitted from the CPE 160 through the subscriber terminal 130 and up to a satellite 105 in various communication signals. The CPE 160, therefore, may transmit data to DOCSIS MAC block 726 for conversion to the DOCSIS protocol before that protocol is translated with an upstream protocol converter 722. The slow-rate data waits in the Tx buffer 716 until it is burst over the satellite link.

The processed data is then transmitted from the Tx buffer 716 to the modulator 725, where it is modulated using one of the techniques described above. In some embodiments, adaptive or variable coding and modulation techniques may be used in these transmissions. Specifically, different modulation and coding combinations, or "modcodes," may be used for different packets, depending on the signal quality metrics from the antenna 125 to the satellite 105. Other factors, such as network and satellite congestion issues, may be factored into the determination, as well. Signal quality information may be received from the satellite or other sources, and various decisions regarding modcode applicability may be made locally at the controller, or remotely. The RF front end 705 may then amplify and upconvert the modulated signals for transmission through the antenna 125 to the satellite.

Map-Trigger Dump

Map Trigger Dump (MTD), implemented at the user SM, maximizes the amount of packet concatenation within upstream frames. It does this by holding a (concatenated) frame back in the first queue, typically a pure software queue SWQ, until the very last instant. The very last instant is that time at which a (concatenated) frame must be "dumped" from the SWQ to the second queue, typically a hardware queue HWQ, (where the data cannot be modified while in the queue) such that the frame at the head of the HWQ, when transmitted, will piggyback a request for the frame that was just dumped.

With MTD, the average frame transmit time is reduced from between [2.5xRTT, 3.5xRTT] to [1.5xRTT, 2.5xRTT]. This will result in a 30% to 40% reduction of the total delay that frames experience when they cross the satellite portion of their end-to-end path. This reduction in transmit time typically results in an improved responsiveness without any effect on efficiency.

Implementation of MTD

Definition of a Virtual Queue for Software Accounting

A notion of Virtual Queue (VQ) is introduced to serve as a repository for accounting. When a (concatenated) frame is dumped from the SWQ to the HWQ, its size in bytes is logged as an entry in the VQ.

A VQ entry will take the abstract form: <Frame Id> <Bytes Remaining> <Fragmented Flag> <Done Flag>. For the purposes of description, an entry takes the following structure (NOTE: this is a simplified structure for illustration of MTD. The complete VQEntry is described hereinafter below:

```
struct VQEntry {
    frameId
    bytesRemaining
    fragmentedFlag
    doneFlag
}
```

When a (concatenated) frame is dumped from the SWQ to the HWQ, the VQEntry.bytesRemaining value is the total length (total_len) of the frame if un-concatenated or the concatenated length (concat_len) if the frame is a concatenated frame.

The field VQEntry.frameId must be selected to represent the entire frame. When the function ReclaimTxFrames( ) executes, packet descriptors and buffer descriptors are reclaimed for SW use. When a (concatenated) frame is fully transmitted (i.e. no more fragments remain in the HWQ), then the entry at the head of the VQ will be purged, therefore something in the final packet descriptor reclaimed in ReclaimTxFrames( ) must be used to match with the entry at the head of the VQ. Possible things that could be used for this are the address of the final packet descriptor of the final frame in a concatenated frame or the address of the header pointer (uint32 hdrptr) of the final packet descriptor of the final frame in a concatenated frame.

The fragmented flag is set to TRUE if the (concatenated) frame under goes fragmentation over the course of its transmission.

The Done flag represents the software's understanding of progress in the hardware queue.

The size of the VQ need only be a few entries deep.

Startup

Assuming that the state machine for MTD starts in an initial state, when a packet aka PDU arrives, an upfront delayed concatenation (UDC) timer will start. All PDUs that arrive prior to the expiry of this UDC timer will be concatenated into this head-of-software-queue frame (S-HoQ frame). When this timer expires, the (concatenated) frame will be dumped into the HWQ. When the S-HoQ frame is dumped, the total size in bytes of this (concatenated) frame is captured in the VQEntry.bytesRemaining field of the tail VQ entry. The fragmented flag is set to FALSE. The done flag is set to FALSE.

Normal Operation

Figure 14:
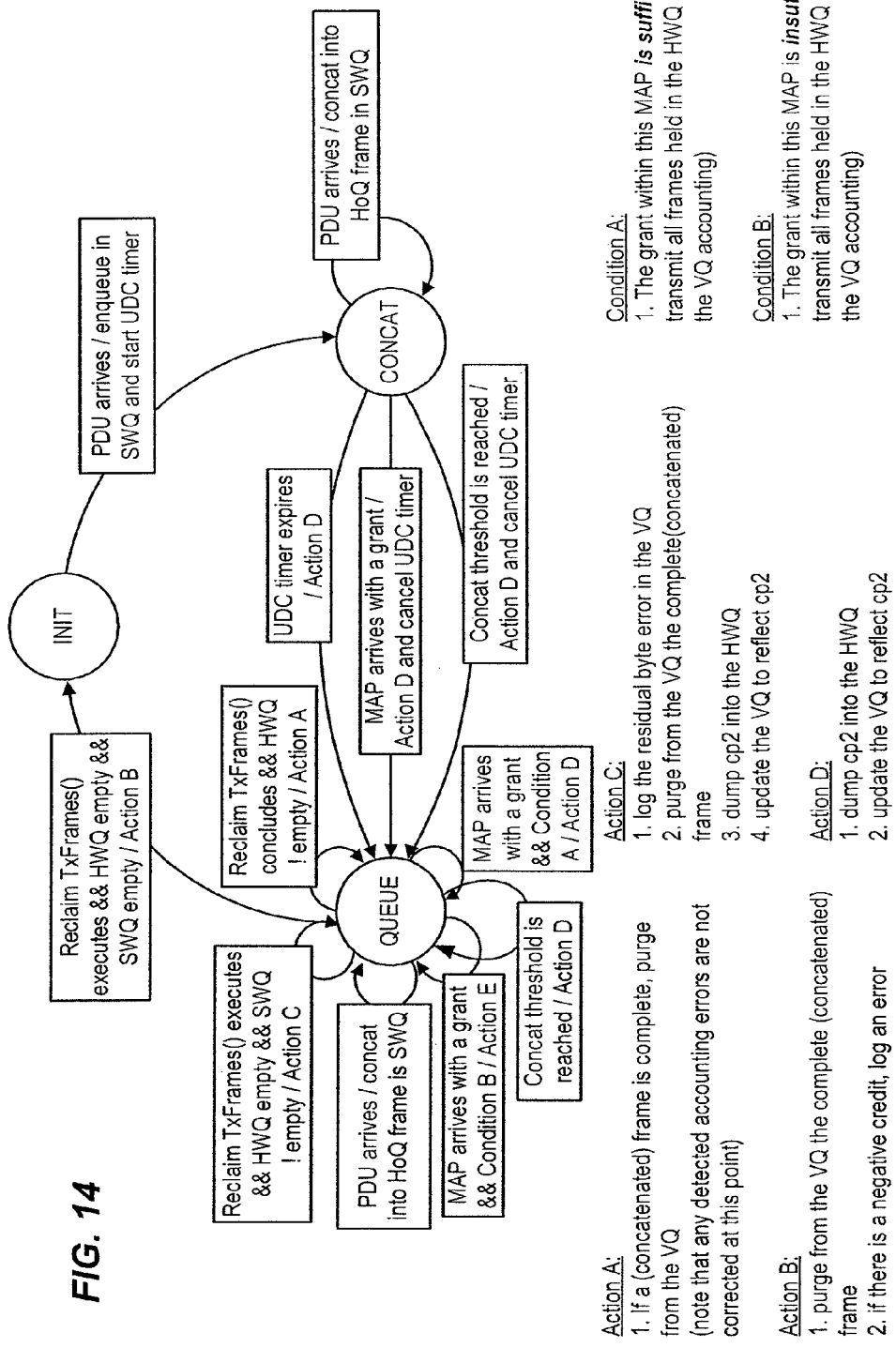
FIG. 14 is a depiction of a state machine according to the invention.

The normal operation of DAMA with MTD according to the invention is shown in FIG. 14 in a simplified version, meant to illustrate MTD.

The (concatenated) frame that sits at the head of the SWQ is referred to as "cp2".

When a MAP arrives to the SW, it is parsed and examined. If a grant is present which is addressed to this SM (called a transmit opportunity or TXOP), then the size of the TXOP in bytes must be compared to the remaining size of the (concatenated) frame at the head of the HWQ (H-HoQ frame). The remaining size of the H-HoQ frame is tabulated in the head entry of the VQ.

The size of the TXOP in bytes is computed from by using the grant size in mini-slots and the PHY lookup tables. Please note that since this computation (mini-slots to bytes) will be running constantly and during the critical $T_P$ phase. Therefore if the PHY computations that are currently used are not computationally efficient, then they must be made so.

If a TXOP is large enough to transport a frame un-fragmented, then the VQEntry.bytesRemaining field will be set to zero and the done flag will be set to TRUE in the head entry in the VQ.

If a TXOP is not large enough to transport a frame un-fragmented, then the H-HoQ frame will be fragmented. The accounting for this is done in the VQ. The amount of bytes subtracted from VQEntry.bytesRemaining will be the fragmented payload. The fragmented payload is the TXOP length in bytes minus the fragmentation header length (12 bytes) and the fragmentation CRC (4 bytes). Once an H-HoQ frame is fragmented, the fragmentedFlag is set to TRUE. Once this flag is TRUE, then the accounting for each subsequent TXOP will take into account the fragmentation header and CRC when updating VQEntry.bytesRemaining.

If the TXOP granted is not large enough to transport the H-HoQ frame, then cp2 is not dumped into the HWQ but is rather held over in the SWQ for further concatenation.

When a MAP arrives, the determination about dumping cp2 is made based upon the first entry in the VQ that does not have its done flag set to TRUE. The size of the TXOP will be compared to the VQEntry.bytesRemaining field in this entry. This allows for a lag between when a frame has completed transmission and when it is actually purged from the VQ.

If the size of the TXOP is large enough to transmit the H-HoQ frame, then cp2 is dumped from the SWQ to the HWQ, so that a request for cp2 will be piggybacked on the H-HoQ frame as it goes out. Keep in mind that a MAP may contain more than one TXOIP addressed to this SM. In this case, the software must make its dump decision based upon the total payload of all of the TXOPs in the MAP. For example, if two TXOPs are received containing enough bytes to transmit the H-HoQ frame, then cp2 must be dumped. Multiple grants could occur when pre-allocation is enabled.

When the function ReclaimTxFrames( ) is executed, this represents either the conclusion of a transmitted frame or frame fragment. When ReclaimTxFrames( ) is executed, the VQ is updated if a (concatenated) frame is known to have completed transmission. This design makes no assumptions about the nature of ReclaimTxFrames( ). If it is called each time a fragment is transmitted, rather than the entire (concatenated) frame, the state machine of FIG. 14 will still function properly.

Pre-allocation can result in bandwidth (TXOPs) being granted at unexpected times. An example of this is the case where a PDU arrives to a system in the INIT state (see FIG. 14). This PDU arrival triggers the UDC timer. While the SW is attempting to concatenate frames, a TXOP is received via a grant in a MAP. Under this condition, the SW must dump whatever it has in the SWQ and account for the (concatenated) frame in the VQ.

What happens when a response to a TXOP is not in time? A TXOP arrives, and cp2 is dumped but it does not arrive in the HWQ in time for the Transmission Controller to form a piggybacked request in the H-HoQ frame for this new frame. In this case, accounting in the VQ should not be affected. What should happen in this case is that the random channel is used to request bandwidth for cp2 rather than use of the piggybacked request. This is not catastrophic.

In the event that the second queue or hardqre queue HWQ is empty and a TXOP arrives (the pre-allocation case mentioned above) and the (concatenated) frame is not able to be dumped to the HWQ in time for transmission, an accounting error is most likely to be incurred. The controller for the first queue SW will assume that the frame was transmitted (or part thereof) when in-fact it was not. When the frame finally does complete its transmission, there will be a credit (i.e., negative value) in the bytesRemaining field of the VQ head entry and should be logged.

Consider the case where, a MAP with a TXOP arrives and it is (erroneously) determined that the size in bytes of the TXOP is insufficient to transmit the H-HoQ frame. In this case, the SW controller will not dump cp2 but will rather "keep it open" to further concatenation. Then ReclaimTxFrames( ) executes and the H-HoQ entry is known to be complete. This represents an accounting error and should be logged. This logging event should record the VQ entry (i.e. <Frame Id> <Bytes Remaining> <Fragmented Flag>) before it is purged from the VQ. After the error is logged and the entry purged from the VQ, then cp2 is dumped into the HWQ and the size of cp2 is entered into the VQ. Again, this should not be catastrophic and will lead to an unnecessary utilization of the random channel.

Consider the case where a VQ accounting is in error again. In this case consider an H-HoQ frame to have completed (or about to be completed subject to a new MAP/TXOP) and as a result cp2 is dumped to the HWQ. In fact, the H-HoQ frame is not done and now there are two (concatenated) frames in the HWQ. There is no attempt to correct this condition and it will be logged when the HWQ eventually drains. The SW should continue to dump cp2 according to the VQ accounting, and it is for this reason that the VQ may need to be more than two entries deep. When the HWQ eventually drains, there will be a credit (i.e. negative number) in the bytesRemaining field. It will appear to the SW as though too much bandwidth was allocated. This condition should be logged. There are cases where the problem will correct itself and there will be no error upon the HWQ draining.

Figure 15:
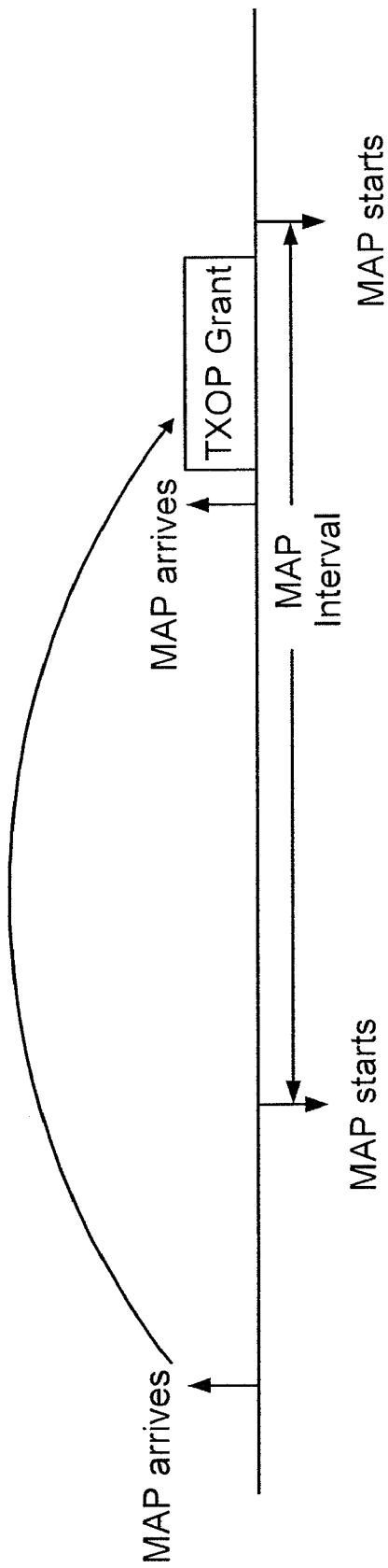
FIG. 15 is a depiction of a simplified state machine with timing according to the invention.

In the case shown in FIG. 15 where a TXOP occurs late in the MAP interval and where the next MAP arrives sufficiently early in the current MAP interval. Back-to-back MAP interval grants can occur as a result of grant fragmentation or pre-allocation. Under this condition the SW should not get confused as to when to dump cp2. The first MAP will contain the TXOP and if this TXOP is sufficient to transmit the H-HoQ frame, cp2 should be dumped and the H-HoQ entry in the VQ must be marked as done. If ReclaimTxFrames( ) has not yet executed by the time the next MAP arrives, then the SW would know that this MAP pertains to the next MAP interval, that the frame that makes up the entry at the head of the VQ is in fact transmitted, and therefore to make its dump decision based upon the next entry in the VQ (the cp2 that was previously dumped) since this entry will have its done flag set to FALSE.

Event Driven State Machine

Referring to FIG. 15 the Event Driven State Machine (ESM) provides instruction for how the SM should act given that an event has occurred. There are four different events.

Figure 16:
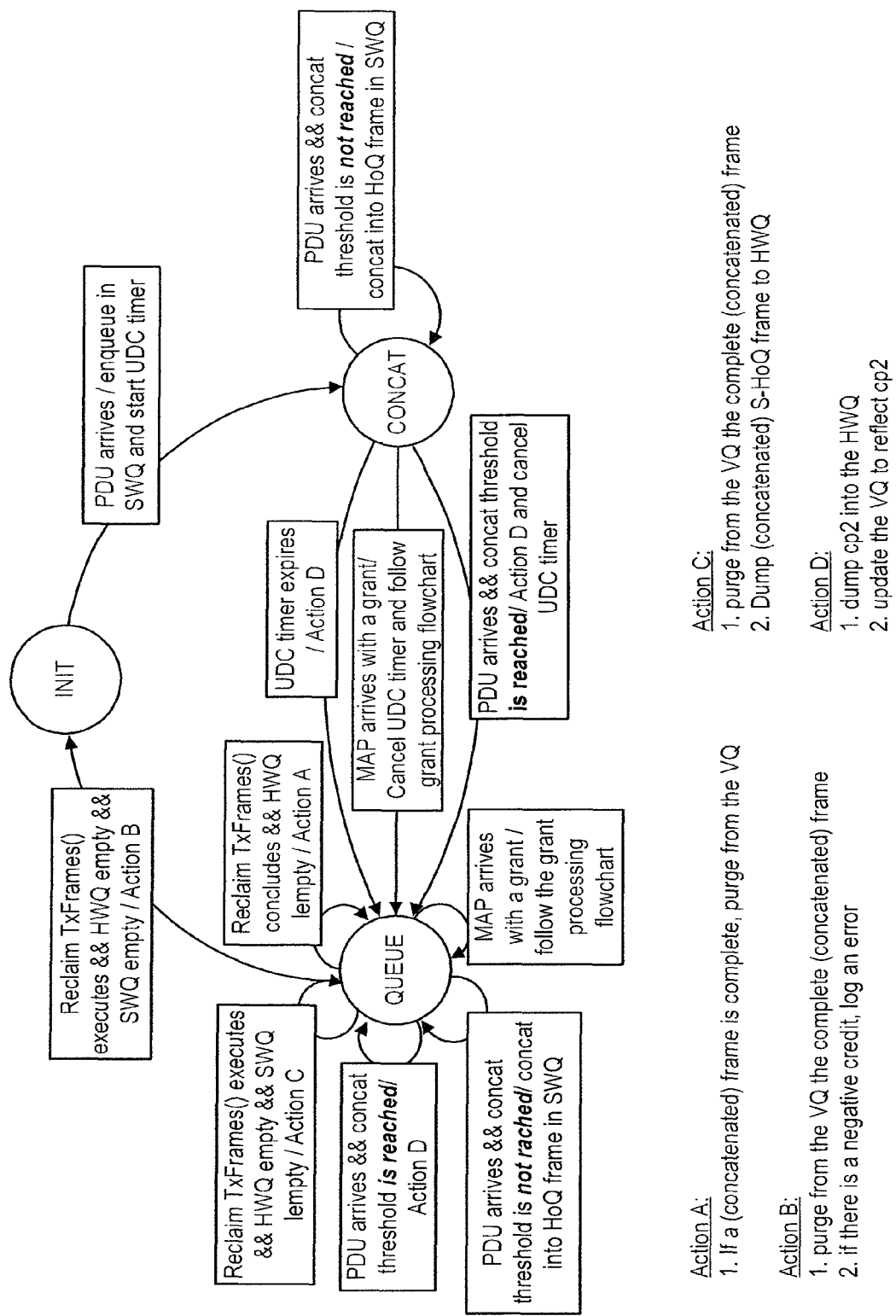
FIG. 16 is a diagram of a state machine with detailed explanations according to the invention.

1. UDC Timer expiry
2. PDU arrival to the SWQ
3. A frame packet descriptor is reclaimed
4. A MAP with grants arrives The ESM is shown in FIG. 16. This state machine supports large packet concatenation (LPC), upfront delayed concatenation (UDC), MAP trigger dump (MTD), Web triggered pre-allocation (PAv2), and BToDAMA.

The (concatenated) frame that sits at the head of the SWQ is referred to as "cp2".

The actions upon UDC timer expiry are straight forward and clear from FIG. 16.

When a PDU arrives, it either is concatenated into an existing frame or becomes the first packet of a new concatenation group.

When a packet descriptor is reclaimed, the SM will take Actions A through C. When the function ReclaimTx Frames( ) is executed, this represents either the conclusion of a transmitted frame or frame fragment. When ReclaimTxFrames( ) is executed, the VQ is updated if a (concatenated) frame is known to have completed transmission. This design makes no assumptions about the nature of ReclaimTxFrames( ). If it is called each time a fragment is transmitted, rather than the entire (concatenated) frame, the state machine of FIGS. 17A-17C will still function properly.

When a MAP arrives with a grant, the actions are a bit more involved and are explained hereinafter below.

The Virtual Queue for Software Accounting

A notion of Virtual Queue (VQ) is introduced to serve as a repository for accounting. When a (concatenated) frame is dumped from the SWQ to the HWQ, its size in bytes is logged as an entry in the VQ.

A VQ entry will take the abstract form: <Frame Id>, <Bytes Remaining>, <Fragmented Flag>, <Done Flag>, <HWQ Empty Upon Dump Flag>, <Phantom Packet Flag>, and <Final Frame Flag>. For the purposes of description, an entry takes the following structure.

```
struct VQEntry {
    list_of_frameIds
    bytesRemaining
    fragmentedFlag
    doneFlag
    heudFlag
    p2Flag
    finalFrameFlag
}
```

When a (concatenated) frame is dumped from the SWQ to the HWQ, the VQEntry.bytesRemaining value is the total length (total_len) of the frame if un-concatenated or the concatenated length (concat_len) if the frame is a concatenated frame.

The field VQEntry.list_of frameIds must be selected to represent the entire frame. When the function ReclaimTxFrames( ) executes, packet descriptors and buffer descriptors are reclaimed for SW use. When a (concatenated) frame is fully transmitted (i.e. no more fragments remain in the HWQ), then the entry at the head of the VQ will be purged. The entry can be purged when all packets in the list_of_frameIds have been reclaimed.

The fragmented flag is set to TRUE if the (concatenated) frame under goes fragmentation over the course of its transmission.

The done flag represents the SW's understanding of progress in the hardware queue.

The heudFlag field is set to TRUE if the (concatenated) frame which is represented by this VQ entry was placed into an empty hardware queue (heud=Hardware queue Empty Upon Dump). This field indicates that not only will this (concatenated) frame submit a request to the random channel, but that it should not have a phantom packet placed in the HWQ behind it.

The p2Flag field is set to TRUE in the VQ entry if the frame which is being dumped to the SWQ is in fact a Phantom Packet ($P^2$). For all other frames, this is set to FALSE.

The finalFrameFlag field is set to TRUE in the VQ entry if the frame being dumped is being dumped due to a grant which is the last grant in a series of grants. Typically this flag is only set for Phantom Packets. This is described in more detail hereinafter below.

The depth of the VQ is driven by the needs of bulk transfer. Assuming that the concatenation limit is ~4000 bytes and that the upstream rate is 512 Kb/s. This corresponds to a XTP transmit window of 62,400 bytes (650 milliseconds*512 Kb/s*1.5/8). If this value is divided by 4000, this makes for 16 concatenated frames; therefore the VQ must have at least 16-20 entries.

Grant Processing Flow

When MAPs arrive at the SM, both the hardware and software parse through them. When a MAP arrives, the software must perform pre-processing to make a tuple <grantSizeInBytes, lastGrantFlag>. A grant tuple has lastGrantFlag set to TRUE if it is the last grant allocated to a particular terminal in the MAP and there are no "Grants Pending" for this terminal. Otherwise it is set to FALSE.

Figure 17A:
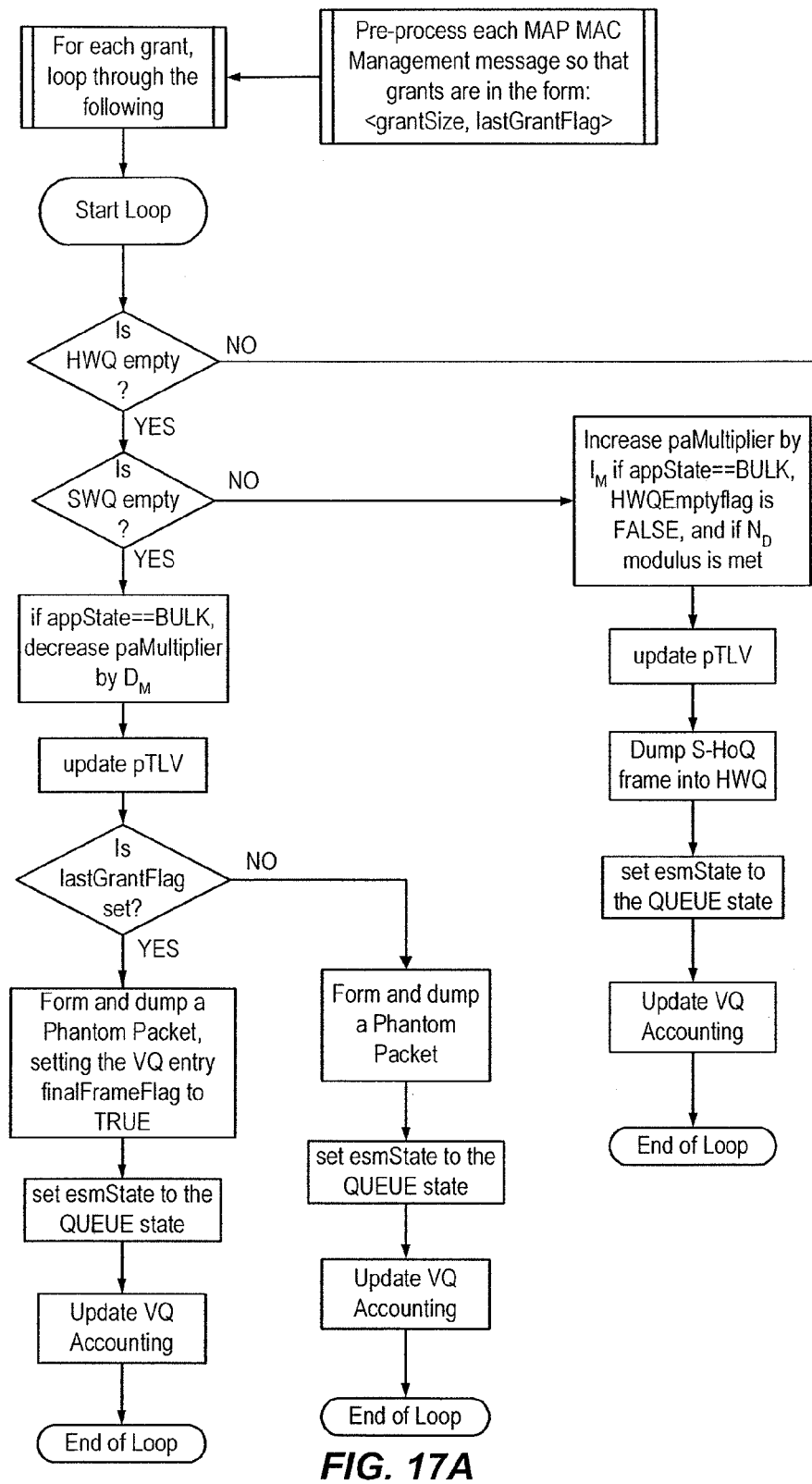
FIGS. 17A, 17B and 17C together form a flow diagram of the invention.
Figure 17B:
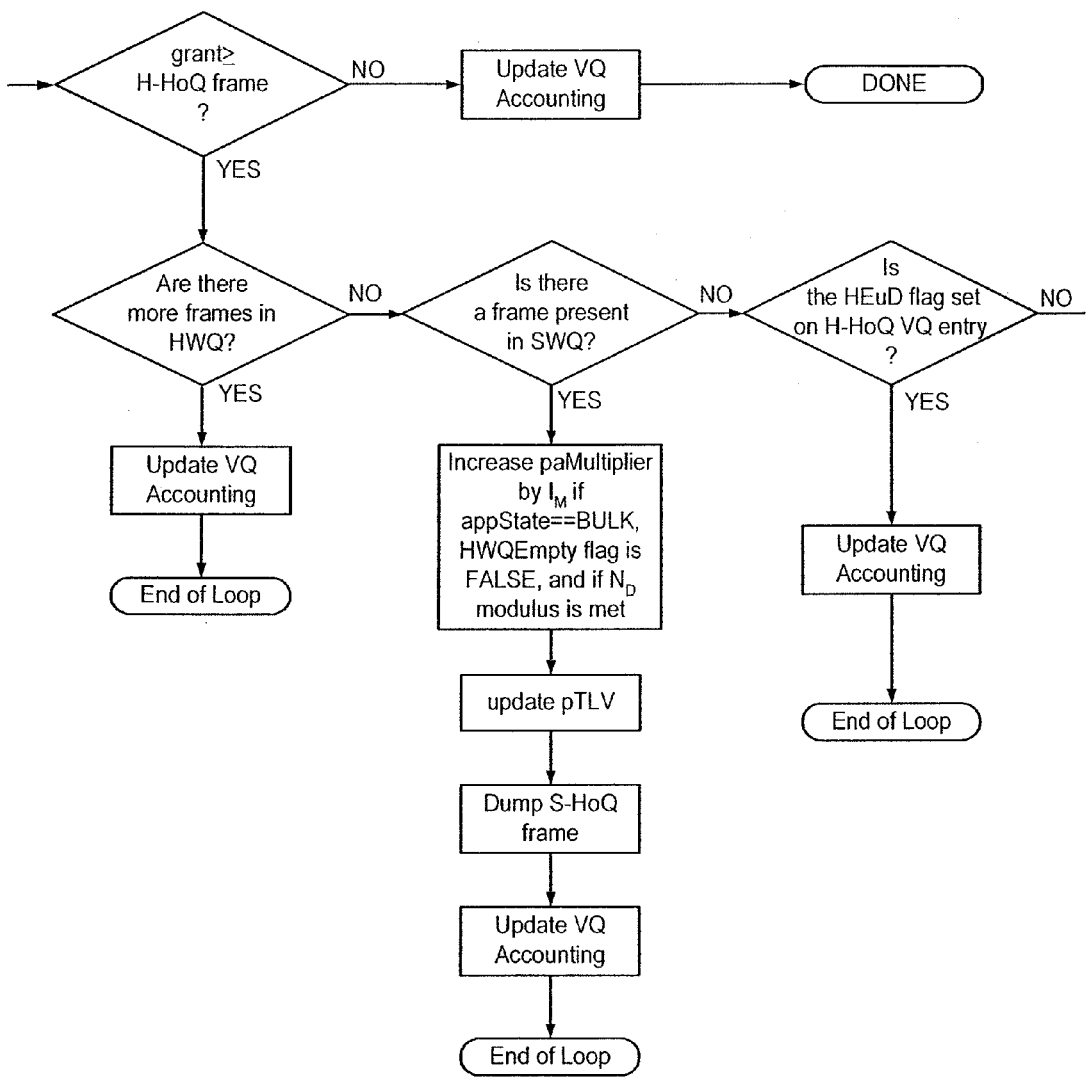
Figure 17C:
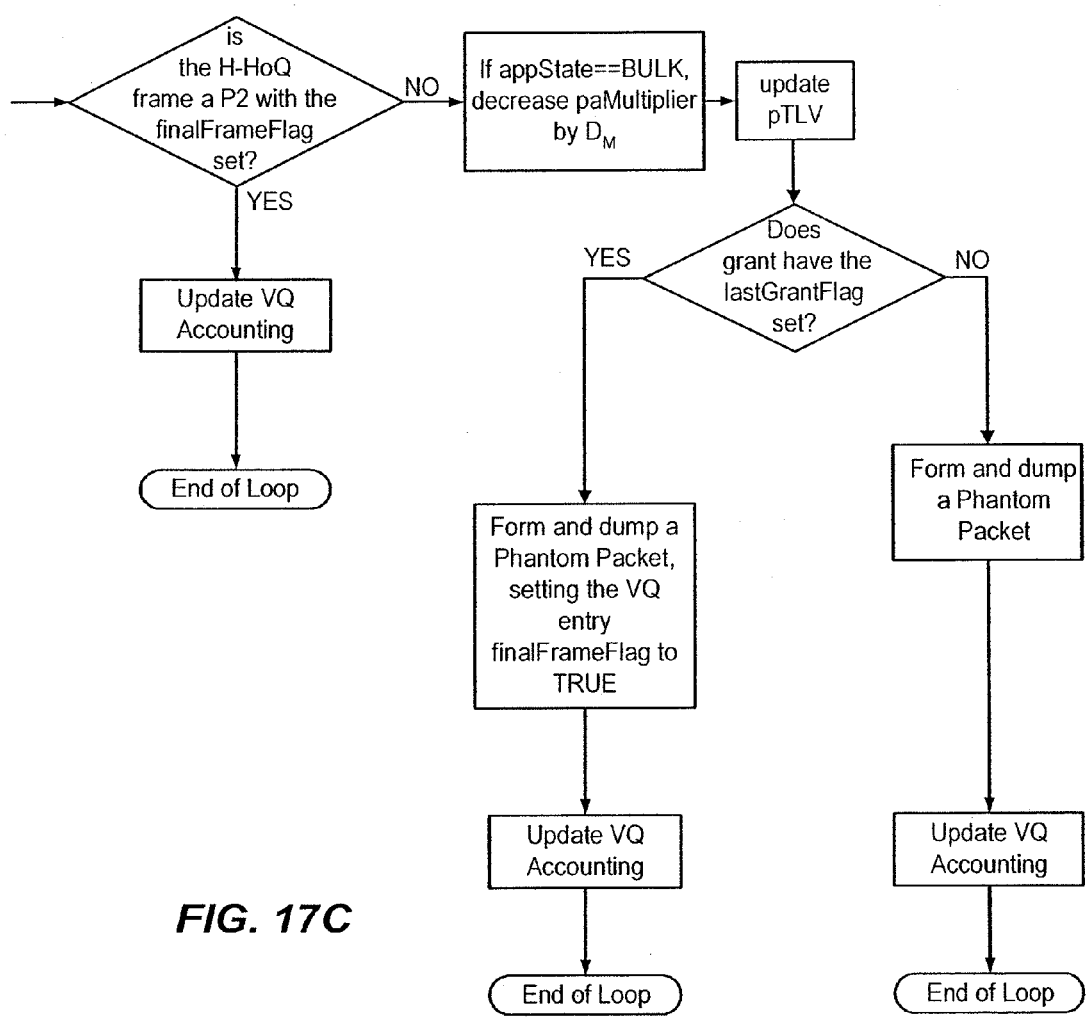

Once all the grants in the MAP that are assigned to a particular SM are arranged as an array of tuples, then the flow chart of FIGS. 17A-C can be executed for each grant tuple.

This flow chart supports MTD, PAv2, and BToDAMA.

When a grant arrives, it is inspected to determine if the S-HoQ frame is to be dumped from the SWQ to the HWQ. This is the standard MTD behavior. Pre-allocation (both Web triggered and bulk) adds an additional requirement to limit random channel over usage. This additional requirement is the "Phantom Packet". The Phantom Packet is dumped from the SWQ to the HWQ when an arriving series of grants will not only empty the HWQ but also empty the SWQ. The Phantom Packet ($P^2$) is a frame that will be discarded by the SMTS and will fit into a single turbo code word (33-35 bytes). Phantom Packets will be inserted for all otherwise unusable grants. Phantom Packets will be used in both PAv2 and BToDAMA to keep the DAMA channel active and out of the random channel. If a source goes silent, Phantom Packets will no longer be inserted. The Phantom Packet is an upstream MAC Management message with an ID of 252.

All Phantom Packets must carry the pTLV. All updates to the pTLV should be done before a dump event (either a concatenated frame dump event or a $P^2$ dump event).

Requirements at the Dump Event (Concatenated) frames will be dumped from the SWQ to the HWQ because either a UDC timer expired, a concat threshold was reached, or a grant arrived that triggered the dump.

For all of these cases, if the appState (of the ASM) is set to BULK, the buffer occupancy of the HWQ must be inspected. If the HWQ is empty, then a counter that is SID specific (i.e. global across all frames within the SID) name HWQEmptyCounter is incremented. If the HWQ is not empty, then this global variable remains unchanged. Every $N_D$ dump events, upon the conclusion of the dump, this global variable is inspected. If the HWQEmptyCounter is greater than or equal to a threshold (currently 2), increase the paMultiplier field of the pTLV by $I_M$. Either way, the HWQEmptyCounter is reset to 0.

The increment of the multiplier is meant to increase the upstream grant rate. Ideally, each $N_D$, the scheduler should allocate enough grants to carry one additional concatenated frame per RTT. The increment $I_M$ is set based upon the average size of a MTD frame divided by the paQuanta value. To simplify the design, $I_M$ is set to be the concat threshold divided by the paQuanta value. This is not completely accurate as some concatenated frames will be much below the concat threshold; however it eliminates the need for computing the average concatenated frame size on the fly.

Error! Objects Cannot be Created from Editing Field Codes. Equation 1

The paMultiplier has a limit placed on it to increase efficiency. This limit allows maintenance of a backlog when transferring at near CoS, so that no more grants are requested than are required.

When Phantom Packets are dumped, the opposite effect is desired. Dumping Phantom Packets implies that the queues are empty and that the modem is not using all the grants that are being granted. It is desired that the bandwidth be ramped down somewhat slower than it is ramped up; therefore the decrement value, $D_M$, will be a scaled version of $I_M$.

Error! Objects Cannot be Created from Editing Field Codes. Equation 2

For each and every $P^2$ inserted, paMultiplier shall be decreased by $D_M$. The paMultiplier will never go below zero.

pTLV Generation and Update

The pTLV is populated and added to the EHDR on the leading frame of a concatenated frame, or to every frame if that is easier. The pTLV will change somewhat slowly with time, depending upon the application (BULK faster than WEB). When the application is WEB, the paQuanta value will change with each update to the windowing algorithm (if windowing is used). When the application is BULK, the paQuanta value will remain fixed however the multiplier will change each time a Phantom Packet is inserted, or when the $N_D^{th}$ frame is dumped into a non-empty HWQ.

Web pTLV Generation and Update

When requesting WEB pre-allocation, the SM will use a static value of paQuanta in the range of 1250 to 3864 bytes, converted to quanta units.

Bulk Transfer pTLV Generation and Update

The pTLV will have paQuanta$_{BULK}$ set to a fixed size. For the purposes of initial integration, this size is 276 bytes (converted to quanta units). When sizing paQuanta for BULK, there is a tradeoff between making the grants large (to potentially carry a large frame efficiently) and making them small (in the event that a frame is just slightly larger than paQuanta, the following paQuanta grant is used to inefficiently carry the fragment). It is the author's intuition that smaller grants are better.

In order to achieve speeds closer to CoS on small files, the paMultiplier for BULK pre-allocation will begin at the limit and ramp down (if necessary) to the correct rate. This feature is known as "Jump to CoS." Under normal conditions, this will only wastebandwidth when there is a non-congestion speed limiting factor (e.g., an FTP server limit).

It should be noted that the systems, methods, and software discussed above are intended merely to be exemplary in nature. It must be stressed that various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow chart, a structure diagram, or a block diagram. Although they may describe the operations as a sequential process, many of the operations can be performed in parallel or concurrently. In addition, the order of the operations may be re-arranged. A process is terminated when its operations are completed, but could have additional steps not included in the figure.

Moreover, as disclosed herein, the terms "storage medium" or "storage device" may represent one or more devices for storing data, including read only memory (ROM), random access memory (RAM), magnetic RAM, core memory, magnetic disk storage mediums, optical storage mediums, flash memory devices or other computer readable mediums for storing information. The term "computer-readable medium" includes, but is not limited to, portable or fixed storage devices, optical storage devices, wireless channels, a sim card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be required before the above elements are considered. Accordingly, the above description should not be taken as limiting the scope of the invention, which is defined in the following claims.

What is claimed is:

1. A method performed by a satellite user terminal, the method comprising:
   receiving data packets; and
   scheduling an upstream transmission of the received data packets by (i) concatenating the received data packets in a first queue to form a concatenated packet for transmission, and (ii) releasing the concatenated packet from the first queue to a second queue when the second queue is empty,
   wherein all packets arriving at the user terminal since a prior piggyback request are concatenated so that all currently known packets are accounted for by each succeeding piggyback request.

2. A method performed by a satellite user terminal, the method comprising:
   receiving data packets; and
   scheduling an upstream transmission of the received data packets by (i) concatenating the received data packets in a first queue to form a concatenated packet for transmission, and (ii) releasing the concatenated packet from the first queue to a second queue when the second queue is empty,
   wherein packets are released to the second queue according to a trigger caused by receipt of a transmit map at the user terminal.

3. A method performed by a satellite user terminal, the method comprising:
   receiving data packets; and
   scheduling an upstream transmission of the received data packets by (i) concatenating the received data packets in a first queue to form a concatenated packet for transmission, and (ii) releasing the concatenated packet from the first queue to a second queue when the second queue is empty,
   wherein packets are released from the first queue to the second queue upon receipt at the user terminal of a valid map containing a viable transmit opportunity element for the user terminal.

4. The method according to claim 3, further including a virtual queue, said virtual queue for holding a description of the size of the data in the second queue for use in determination of the viable transmit opportunity.

5. A method performed by a satellite user terminal, the method comprising:
   receiving data packets; and
   scheduling an upstream transmission of the received data packets by (i) concatenating the received data packets in a first queue to form a concatenated packet for transmission, and (ii) releasing the concatenated packet from the first queue to a second queue when the second queue is empty,
   wherein said first queue is a software queue and said second queue is a hardware queue, said second queue containing unmodifiable data.

6. A method performed by a satellite user terminal, the method comprising:
   receiving data packets; and
   scheduling an upstream transmission of the received data packets by (i) concatenating the received data packets in a first queue to form a concatenated packet for transmission, and (ii) releasing the concatenated packet from the first queue to a second queue when the second queue is empty,
   further including the step of:
   introducing a phantom packet into the first queue when the second queue is completely drained in order to minimize usage of a contention-associated request channel.

7. A satellite user terminal comprising:
   a receiver configured to receive data packets; and
   a processor, communicatively coupled to the receiver, configured to schedule an upstream transmission of the received data packets by (i) concatenating the received data packets in a first queue to form a concatenated packet for transmission, and (ii) releasing the concatenated packet from the first queue to a second queue when the second queue is empty, said transmitter being further configured to release the concatenated packet from the first queue to the second queue using a transmit map having been received at the satellite user terminal.

8. A satellite user terminal comprising:
a receiver configured to receive data packets; and
a processor, communicatively coupled to the receiver, configured to schedule an upstream transmission of the received data packets by (i) concatenating the received data packets in a first queue to form a concatenated packet for transmission, and (ii) releasing the concatenated packet from the first queue to a second queue when the second queue is empty,
said transmitter being further configured to release the concatenated packet from the first queue to the second queue using a valid map containing a viable transmit opportunity element for the satellite user terminal having been received at the satellite user terminal.

* * * * *